United States Patent
Wang et al.

(10) Patent No.: US 10,186,887 B2
(45) Date of Patent: Jan. 22, 2019

(54) SYSTEMS AND METHODS FOR FAST CHARGING BATTERIES AT LOW TEMPERATURES

(71) Applicant: EC POWER, LLC, State College, PA (US)

(72) Inventors: Chao-Yang Wang, State College, PA (US); Yan Ji, State College, PA (US)

(73) Assignee: EC Power, LLC, State College, PA (US)

( * ) Notice: Subject to any disclaimer, the term of this patent is extended or adjusted under 35 U.S.C. 154(b) by 117 days.

(21) Appl. No.: 14/810,396

(22) Filed: Jul. 27, 2015

(65) Prior Publication Data

US 2016/0023563 A1    Jan. 28, 2016

Related U.S. Application Data

(60) Provisional application No. 62/029,865, filed on Jul. 28, 2014.

(51) Int. Cl.
*H02J 7/00* (2006.01)
*B60L 11/18* (2006.01)
*H01M 10/00* (2006.01)

(52) U.S. Cl.
CPC ............. *H02J 7/007* (2013.01); *B60L 11/187* (2013.01); *H01M 10/00* (2013.01);
(Continued)

(58) Field of Classification Search
USPC .................................................. 320/150–154
See application file for complete search history.

(56) References Cited

U.S. PATENT DOCUMENTS 5,617,009 A  *  4/1997  Takao ................... H02J 7/0073
                                                  320/138
5,849,431 A     12/1998  Kita et al.
(Continued)

FOREIGN PATENT DOCUMENTS

DE       102012210146 A1    12/2013
EP           2581257 A2      4/2013
(Continued)

OTHER PUBLICATIONS

Machine Translation of JP2010-205710.*
(Continued)

*Primary Examiner* — Samuel Berhanu
(74) *Attorney, Agent, or Firm* — McDermott Will & Emery LLP

(57) ABSTRACT

Rechargeable batteries, charging methods and systems for fast charging of the battery under all environmental temperatures and without causing battery degradation are disclosed. A charging control system for charging a rechargeable battery can include an ohmically modulated battery, a temperature sensor configured to monitor a temperature of the battery: a switch that can electrically engage the battery to a source of electrical current through either a low-resistance terminal or a high-resistance terminal of the battery: and a controller electrically connected to the temperature sensor and the switch and that can receive input from the temperature sensor and is programmed to determine whether to electrically engage the battery to the source of electrical current through either the low-resistance terminal or the high-resistance terminal through the switch based on input from the temperature sensor.

20 Claims, 19 Drawing Sheets

(52) U.S. Cl.
CPC ......... *H02J 7/0091* (2013.01); *B60L 11/1861* (2013.01); *Y02T 10/7005* (2013.01); *Y02T 10/705* (2013.01); *Y02T 10/7044* (2013.01)

(56) References Cited

U.S. PATENT DOCUMENTS

| | | | |
|---|---|---|---|
| 6,072,301 A | | 6/2000 | Ashtiani et al. |
| 6,326,767 B1 * | | 12/2001 | Small .................. H01M 2/1055 320/116 |
| 6,441,588 B1 | | 8/2002 | Yagi et al. |
| 7,482,816 B2 * | | 1/2009 | Odajima ............... H02J 7/0019 320/132 |
| 7,976,975 B2 * | | 7/2011 | Ajiki .................... H01M 14/005 320/101 |
| 8,334,675 B2 | | 12/2012 | Wang et al. |
| 2001/0049050 A1 | | 12/2001 | Aragane et al. |
| 2003/0091892 A1 | | 5/2003 | Watanabe et al. |
| 2006/0275653 A1 | | 12/2006 | Chang et al. |
| 2009/0087723 A1 | | 4/2009 | Inda |
| 2010/0173179 A1 | | 7/2010 | Matthias |
| 2010/0264883 A1 | | 10/2010 | Aiura |
| 2012/0025773 A1 * | | 2/2012 | Wang ...................... H02J 7/045 320/129 |
| 2012/0032642 A1 | | 2/2012 | Xu et al. |
| 2012/0098481 A1 | | 4/2012 | Hunter et al. |
| 2013/0234648 A1 | | 9/2013 | Kelty et al. |
| 2013/0288089 A1 | | 10/2013 | Kinoshita et al. |
| 2015/0303444 A1 | | 10/2015 | Wang et al. |

FOREIGN PATENT DOCUMENTS

| | | |
|---|---|---|
| JP | 09-092335 A | 4/1997 |
| JP | 2002-369402 A | 12/2002 |
| JP | 2009-118729 A | 5/2009 |
| JP | 2010-205710 A | 9/2010 |
| JP | 2012-069280 A | 4/2012 |
| JP | 2012-069496 A | 4/2012 |
| WO | 2013/186079 A1 | 12/2013 |

OTHER PUBLICATIONS

Entire file history of U.S. Appl. No. 14/189,517.
Entire file history of U.S. Appl. No. 14/255,780.
Entire file history of U.S. Appl. No. 15/028,696.
Entire file history of U.S. Appl. No. 15/288,580.
Entire file history of U.S. Appl. No. 14/267,648.
Entire file history of U.S. Appl. No. 14/189,841.
Entire file history of U.S. Appl. No. 14/447,005.
Fan, J. et al., "Studies on Charging Lithium-Ion Cells at Low Temperatures," Journal of the Electrochemical Society, (2006) 153 (6) A1081-A1092.
Huang, C.K. et al., "The Limits of Low-Temperature Performance of Li-Ion Cells," Journal of the Electrochemical Society, (2000) 147 (8) 2893-2896.
Ji, Y. et al., "Li-ion cell operation at low temperatures", J. Electrochemical Society, (2013) 160(4) A636-A649.
Ji, Y. et al. (CY Wang), "Heating strategies for Li-ion batteries operated from subzero temperatures", Electrochimica Acta (2013) 107:664-674.
Lin, H.P. et al., "Low-Temperature Behavior of Li-Ion Cells," Electrochemical Solid-State Letters, (2001) 4 (6) A71-A73.
Nagasubramanian, G., "Electrical characteristics of 18650 Li-ion cells at low temperatures," J Appl Electrochem, (2001) 31:99-104.
Pesaran, A. et al., "Cooling and Preheating of Batteries in Hybrid Electric Vehicles," The 6th ASME-JSME Thermal Engineering Joint Conference, Hawaii Island, Hawaii, 2003.
Smart, M.C. et al., "Electrolytes for Low-Temperature Lithium Batteries Based on Ternary Mixtures of Aliphatic Carbonates," Journal of the Electrochemical Society, (1999) 146 (2) 486-492.
Smart, M.C. et al., "Use of Organic Esters as Cosolvents in Electrolytes for Lithium-Ion Batteries with Improved Low Temperature Performance," Journal of the Electrochemical Society, (2002) 149 (4) A361-A370.
Zhang, S.S. et al., "Charge and discharge characteristics of a commerical LiCoO2-based 18650 Li-ion batter," Journal of Power Sources, (2006) 160:1403-1409.
Zhang, S.S. et al., "Electrochemical impedance study on the low temperature of Li-ion batteries," Electrochim Acta, (2004) 49:1057-1061.
Zhang, S.S. et al., "The low temperature performance of Li-ion batteries," J. of Power Sources, (2003)115:137-140.
Zhang, S.S.et al., "Low temperature performance of graphite electrode in Li-ion cells," Electrochimica Acta, (2002) 48:241-246.
Zolot, M.D. et al., "Thermal Evaluation of the Honda Insight Battery Pack," in: 36th Intersociety Energy Conversion Engineering Conference, Savannah, GA, 2001, pp. 923.
International Search Report and Written Opinion issued in International Patent Application No. PCT/US2014/037209, dated Sep. 2, 2014; 10 pages.
International Search Report and Written Opinion issued in International Patent Application No. PCT/US2014/059729, dated Jun. 29, 2015; 12 pages.
International Search Report and Written Opinion issued in International Patent Application No. PCT/US2014/059726, dated Jun. 26, 2015; 13 pages.
International Search Report and Written Opinion dated Oct. 27, 2015 issued in International Patent Applicaton No. PCT/US2015/042304.
Non-Final Office Action dated Oct. 19, 2017 in co-pending U.S. Appl. No. 14/255,780.
Chinese Office Action issued in Application No. 20158052062.X dated Nov. 19, 2018, with partial English translation.

* cited by examiner

SYSTEMS AND METHODS FOR FAST CHARGING BATTERIES AT LOW TEMPERATURES

CROSS-REFERENCE TO RELATED APPLICATION

This application claims the benefit of U.S. Provisional Application No. 62/029,865 filed Jul. 28, 2014, the entire disclosure of which is hereby incorporated by reference herein.

TECHNICAL FIELD

The present invention generally relates to systems and methods of charging batteries at low temperatures and in particular to fast charging batteries below normal operating temperatures of the batteries.

BACKGROUND

Rechargeable batteries for electronics, transportation and grid energy storage commonly have poor charge acceptance and suffer from excessively long charge time, especially at subfreezing temperatures, due to sluggish electrochemical kinetics and transport processes occurring in the battery cell. Charging batteries at reasonable rates in cold weathers are either impossible to carry out or incur much shortened battery life. For example, the biggest problem for charging lithium-ion batteries at low temperatures is the lithium plating in the graphitic anode. The deposited lithium reacts quickly with the electrolyte leading to irreversible capacity loss. Furthermore, the metallic lithium grows in dendrite form, creating the possibility of penetrating separator and shorting the cell internally. To avoid lithium plating, lithium-ion batteries are charged at very low rate (C/10 or less) at low temperatures, which requires tremendous amount of time to be fully charged.

The long charging time poses a great disadvantage to energy storage solutions, especially electric vehicles (EV). Compared to traditional gasoline-powered vehicles whose fuel tank can be filled up in less than five minutes under all conditions, EV requires hours to get a full recharge in cold weathers. Fast charging is essential to enable public charge stations and battery-powered electric vehicles.

Because of high sensitivity of battery charge acceptance to temperature, charging time can be reduced by heating rechargeable batteries to a near room-temperature range suitable for fast charging. Conventional battery heating systems, however, heat the battery externally by using convective air/liquid heating or thermal jackets, where heat slowly propagates from the exterior into the electrochemical reaction interface inside the battery. Such processes suffer from long heating time and significant heat loss to the surroundings.

Accordingly, a continuing need exists to reduce the charging time of a rechargeable battery without deleteriously affecting the battery.

SUMMARY OF THE DISCLOSURE

An advantage of the present disclosure is a charging control system for charging an ohmically modulated rechargeable battery and methods for its operation. Such a system can be included in an electrically powered vehicle, e.g., an electric vehicle (EV), hybrid electric vehicle (HEV), and plug-in hybrid electric vehicle (PHEV).

These and other advantages are satisfied, at least in part, by a charging control system for charging an ohmically modulated rechargeable battery comprising: a temperature sensor configured to monitor a temperature of the battery; a switch that can electrically engage the battery to a source of electrical current through either a low-resistance terminal or a high-resistance terminal of the battery, or both; and a controller electrically connected to the temperature sensor and the switch and that can receive input from the temperature sensor and is programmed to determine whether to electrically engage the battery to the source of electrical current through either the low-resistance terminal or the high-resistance terminal through the switch based on input from the temperature sensor. The system can include additional components, individually or in combination, such as one or more of a current sensor electrically connected to the battery and capable of measuring current flowing through the battery and/or one or more voltage sensors such as a voltage sensor electrically connected to the low-resistance terminal of the battery; and a voltage sensor electrically connected to the high-resistance terminal voltage of the battery. With the additional sensors, the controller can receive inputs from the additional sensors and is programmed to determine whether to electrically engage the battery to the source of electrical current through either the low-resistance terminal or the high-resistance terminal through the switch based on inputs from some or all of the sensors. The system can also include a generator electrically connected to the battery and capable of charging the battery. The generator can be used to capture kinetic energy, such as in regenerative braking in vehicles, and charge the battery with such energy.

Another aspect of the present disclosure includes a method of charging an ohmically modulated rechargeable battery. The method comprises: charging the battery under a low temperature charging protocol (LTCP) when the battery is in a high resistance mode; and charging the battery under a second protocol when the battery is in a low resistance mode.

Embodiments of the LTCPs include charging the battery under constant voltage, and/or at a constant current (I) and/or at a constant charging power (P) and combinations thereof. In one embodiment of the present disclosure, the LTCP includes: (i) charging the battery at either a constant voltage or a constant charging power (P); and (ii) followed by charging the battery at a constant current. Charging the battery at the constant current can occur when the charging current reaches or exceeds a predetermined maximum charge current ($I_{max}$). Further, the constant voltage can be determined from either the low-resistance terminal voltage $V_{LoR}$ and/or the voltage of the battery. The LTCP also can include charging the battery under a pulse voltage and/or pulse power and/or pulse current and combinations thereof. LTCPs can further include charging the battery in the high resistance mode when a temperature of the battery is below a predetermined level $T_{CG1}$, e.g. wherein $T_{CG1}$ is a value between 5° C. and 25° C., and charging the battery in the low resistance mode when the temperature of the battery is equal to or above $T_{CG1}$.

Embodiments of charging the battery under the second protocol, i.e., in the low resistance mode, include charging the battery under a constant current, constant voltage protocol, wherein the constant current is about 1 C or higher and the constant voltage is about $V_{set}$, wherein $V_{set}$ is a predetermined voltage. Advantageously, the protocol can include charging the battery in the low resistance mode when the temperature of the battery is equal to or above a predetermined level $T_{CG1}$, e.g., wherein $T_{CG1}$ is a value between 5° C. and 25° C.

Another aspect of the present disclosure includes a method of charging an ohmically modulated rechargeable battery with regenerative energy, the method comprising: charging the battery under a regenerative charging protocol (RCP) when the battery is in a high resistance mode, e.g., when the temperature of the battery is below a predetermined charge value ($T_{CG1}$); and charging the battery under a second protocol when the battery is in a low resistance mode, e.g., when the temperature of the battery is above $T_{CG1}$. Advantageously, the current applied to charge the battery under either RCP or the second protocol is converted from kinetic energy.

Embodiments of the RCP include charging the battery by applying a charging current to the battery in voltage controlled form or in power P controlled form or in current controlled for or combinations thereof. The voltage controlled form, power P controlled form and current controlled form can be either a constant value or a function of time. In one embodiment of the present disclosure, the RCP includes (i) charging the battery by applying a charging current to the battery in voltage controlled form or in power P controlled form, (ii) followed by charging the battery at a constant current; wherein the voltage controlled form is determined either at the low-resistance terminal voltage $V_{LoR}(t)$ of the battery or at the voltage of the battery $V(t)$. Charging under the second protocol when the battery is in the low resistance mode can include a constant current-constant voltage protocol, for example. RCPs can further include charging the battery in the high resistance mode when a temperature of the battery is below a predetermined level $T_{CG1}$, e.g. wherein $T_{CG1}$ is a value between 5° C. and 25° C., and charging the battery in the low resistance mode when the temperature of the battery is equal to or above $T_{CG1}$.

Additional advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

Reference is made to the attached drawings, wherein elements having the same reference numeral designations represent similar elements throughout and wherein.

DETAILED DESCRIPTION OF THE DISCLOSURE

Ohmically Modulated Battery

Figure 1A:
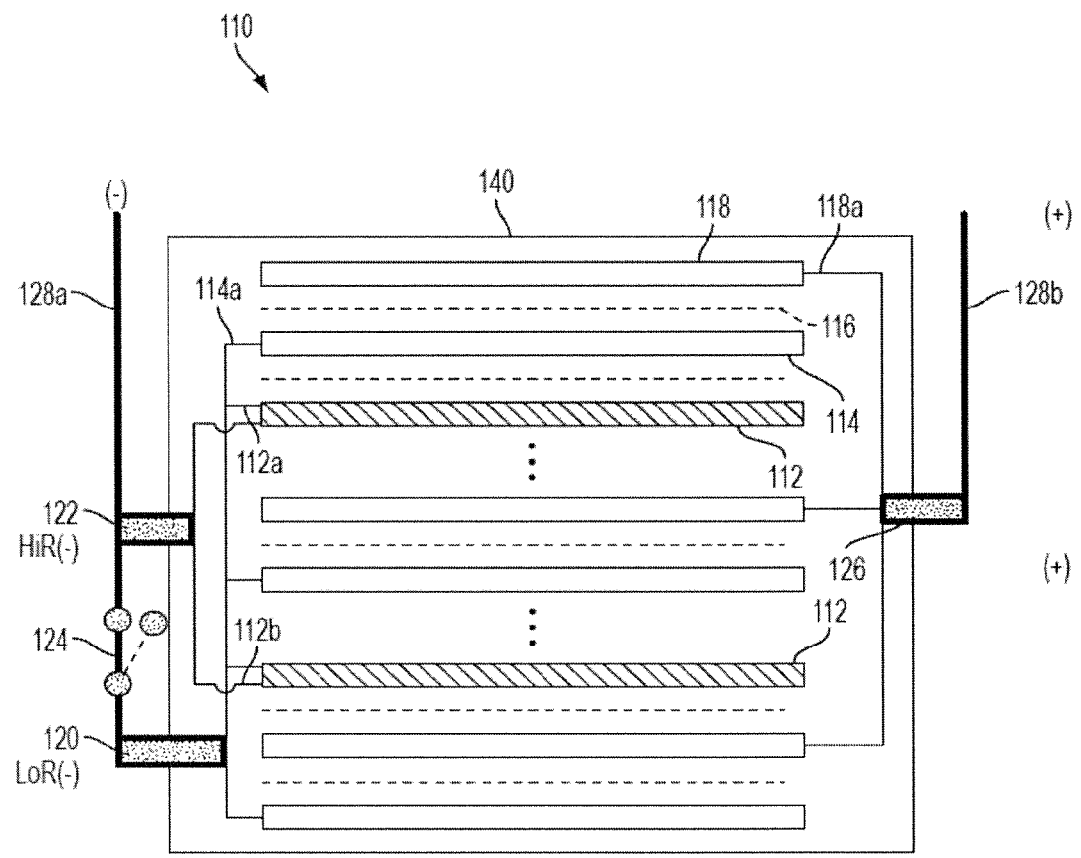
FIG. 1A is a schematic showing construction of an ohmically modulated battery having several resistor sheets/foils embedded within a stack of electrode-separator assemblies, one high-resistance negative terminal HiR(−) and one low-resistance negative terminal LoR(−), one positive terminal (+), and a thermally activated switch connecting the HiR(−) and LoR(−) terminals, according to an embodiment of the present disclosure.

Rechargeable batteries have been engineered to substantially increase the internal resistance of the battery at low temperatures, e.g., at temperatures below the normal operating temperature of the particular battery. Such batteries have been disclosed for example in co-pending U.S. patent application Ser. No. 14/267,648, filed May 1, 2014, and PCT/US2014/059729, filed Oct. 8, 2014, both entitled Ohmically Modulated Battery, the entire disclosure of both of which are hereby incorporated by reference herein.

As used herein the terms ohmic modulation of a rechargeable battery or an ohmically modulated rechargeable battery refer to a rechargeable battery engineered to have more than one internal resistance level that can change substantially with battery temperature. This deliberate ohmic modulation can be engineered either actively or passively.

An advantage of such rechargeable batteries is that the internal resistance of the battery can change substantially when the battery temperature falls below a predetermined level. The high internal resistance of the battery creates heat within the battery to warm the battery. Preferably the internal resistance of the battery becomes high enough to rapidly warm the battery by tens of degree Celsius within seconds or within up to a few minutes. After the battery temperature reaches a desired level, the high internal resistance is deactivated allowing the battery to operate at a low-resistance mode, e.g., as low as in conventional batteries, thereby enabling the battery to deliver high power and energy despite being in a low temperature environment.

Preferably, the rechargeable battery can comprise one level of internal resistance ($R_1$) over a temperature range of the battery between a first temperature ($T_1$) and a second temperature ($T_2$), and a second level of internal resistance ($R_2$) outside of either $T_1$ or $T_2$. Preferably the value of $R_2$ changes abruptly, such as in a step function, or changes sharply, such as in a continuous but rapid change in resistance, below around $T_1$ and/or at above around $T_2$. For example, the value of $R_2$ at about 2° C. below $T_1$ is at least twice the value of $R_1$ at $T_1$ or the value of $R_2$ at about 2° C. above $T_2$ is at least twice the value of $R_1$ at $T_2$. Advantageously, the value of $R_2$ at about 2° C. below $T_1$ is at least twice to fifty times the value of $R_1$ at $T_1$ and the value of $R_2$ at about 2° C. above $T_2$ is at least twice to fifty times the value of $R_1$ at $T_2$. The ohmic modulation of the battery is advantageously reversible, i.e., the internal resistance can switch back from $R_2$ to $R_1$ between $T_1$ and $T_2$. Embodiments of the present disclosure include wherein the value of $R_2/R_1$ is between and including 2 to 500, e.g., the value of $R_2/R_1$ is between and including 2 to 100, or 2 to 50, when the value of $R_2$ is determined at about 2° C. below $T_1$ and $R_1$ is determined at $T_1$. Additional or alternative embodiments include wherein the value of $R_2/R_1$ is between and including 2 to 500, e.g., the value of $R_2/R_1$ is between and including 2 to 100, or 2 to 50, when the value of $R_2$ is determined at about 2° C. above $T_2$ and $R_1$ is determined at $T_2$. The ohmic modulation of the battery is advantageously reversible, i.e., the internal resistance can switch back from $R_2$ to $R_1$ between $T_1$ and $T_2$.

As used herein the terms rechargeable battery or battery are used to represent any rechargeable electrochemical energy storage device that contains one or more electrochemical cells. The basic elements of a battery cell include an anode electrode coated on a current collector, a separator, a cathode electrode coated on another current collector and an electrolyte.

The battery configuration of the present disclosure can be applied to a variety of batteries such as, but not limited to, lithium-ion, lithium-polymer, lead-acid, nickel-metal hydride, lithium-sulfur, lithium-air and all solid-state batteries. Such batteries are useful for transportation, aerospace, military, and stationary energy storage applications.

In an embodiment of the present disclosure, a rechargeable battery can have at least two levels of internal resistance which depend on the battery's temperature. As used herein the temperature of the battery can be the internal temperature or external surface temperature of the battery. The rechargeable battery of the present embodiment can be configured to operate at a higher resistance level when the internal temperature of the battery is below an optimum temperature, e.g. below $T_1$, thereby heating the battery and improving battery performance. For example, when the battery's internal temperature is below a normal range, e.g. below normal operating temperatures such as below about 5° C. or in subfreezing environments (temperatures less than about 0° C., e.g., less than about −10 or −20° C.), the internal resistance of the battery becomes several-fold higher than when the battery operates in the normal temperature range (e.g. in the range of from about 40 $\Omega cm^2$ to about 200 $\Omega cm^2$). As a result, there is much intensified internal heating (as the battery's heat generation is proportional to its internal resistance), which leads to rapid rise of the battery's internal temperature. This in turn quickly improves power and energy output of the battery while operating in subfreezing environments.

A rechargeable battery of the present disclosure can include the conventional components of a rechargeable battery and additionally include one or more components to modulate the internal resistance of the battery.

For example, an ohmically modulated rechargeable battery can include at least one negative terminal and at least one positive terminal for operating the battery at $R_1$, e.g. at a low internal resistance level (LoR), above $T_1$. The ohmically modulated battery can also include at least one high resistance terminal for operating the battery at $R_2$, e.g. at a high internal resistance level (HiR), when the battery temperature is below $T_1$. The high resistance terminal can either be an additional negative terminal (i.e., a HiR (−)) or an additional positive terminal (i.e., a HiR(+)).

Such a rechargeable battery can include a switch that switches the resistance levels of the battery. For example the switch can engage the low resistance terminals of the battery, e.g., LoR (−) and/or LoR (+), to operate the battery when the temperature of the battery is above $T_1$, and can engage one or more high resistance terminal, e.g., HiR(−) and/or HiR(+), when the battery temperature is below $T_1$.

The switch of the present disclosure can be composed of an electromechanical relay and a temperature controller, or a solid-state relay with a temperature sensor, a power MOSFET with a temperature sensor, or a high-current switch with a temperature sensor. Alternatively, the switch connecting LoR(−) and HiR(−) terminals can be carried out by a controller having an electric circuit and a cell temperature sensor in a battery management system.

In an embodiment of the present disclosure, the rechargeable battery includes at least one resistor sheet that is electrically connected to the high resistance terminal. The at least one resistor sheet can be located either inside a battery cell (exposed to the electrolyte), or outside and between two battery cells, or a combination of some resistor sheets inside cells and some resistor sheets outside and between cells. The resistor sheet configured with a cell of the battery can be integrally part of the current collector of an electrode of the cell of the battery As used herein, a resistor sheet is a material that has a lower conductivity (higher electrical resistance) relative to the battery current-collecting foils and, when activated during battery operation, causes a significant increase in the internal electrical resistance of the battery. The resistor sheet preferably has a resistance in units of Ohm equal to the numerical value of between 0.1 to 5 divided by the battery's capacity in Amp-hours (Ah), e.g. between about 0.5 to 2 divided by the battery's capacity in Ah. For example the resistor sheet for a 20 Ah battery is preferably between about 0.005 Ohm (0.1 divided by 20) to about 0.25 Ohm (5 divided by 20), e.g. between about 0.025 Ohm (0.5 divided by 20) to about 0.1 Ohm (2 divided by 20).

The resistor sheets of the present disclosure can be any metal that is stable when exposed to battery electrolytes and within the electrochemical voltage window of a rechargeable battery when the resistor sheet is exposed to such an environment. Such resistor sheets can be made of graphite, highly ordered pyrolytic graphite (HOPG), stainless steel, nickel, chrome, nichrome, copper, aluminum, titanium, or combinations thereof. If used outside battery cells and between two adjacent cells in a module, the resistor sheets do not need to be anti-corrosive and thus additional materials are available for use as resistor sheets of the present disclosure. The resistor sheet of the present disclosure preferably is flat with large surface area in good contact with adjacent battery components and has a thickness between about 1 and about 150 micrometers with a preferred range of about 5 to about 60 micrometers. Resistor sheets that have large electrical resistance, high thermal conductivity, and small heat capacity are useful for certain embodiments of the present disclosure.

In certain configurations of the present disclosure, the rechargeable battery includes one or more high resistance tabs or terminals and one or more low resistance tabs or terminals. The high resistance terminals electrically connect the one or more resistance sheets and the low resistance tabs or terminals are configured to operate the battery in a low resistance mode.

Advantageously, the rechargeable battery of the present disclosure can be readily configured with conventional rechargeable battery components with minimal modification in certain embodiments, additionally including one or more high resistance terminals connected to one or more resistor sheets, for example. The following figures illustrate certain embodiments of the present disclosure.

FIG. 1A illustrates an embodiment of an ohmically modulated battery. As shown in FIG. 1A, rechargeable battery 110 has several resistor sheets 112 embedded within a stack of electrode-separator assemblies and in contact with the electrolyte. The electrode-separator assemblies include anode electrodes 114 having anode tabs 114a, separators 116 and cathode electrodes 118 having cathode tabs 118a. Battery 110 further includes one low-resistance negative terminal LoR(−) 120 and one high-resistance negative terminal HiR(−) 122, switch 124 and positive terminal (+) 126.

In this embodiment, each resistor sheet has two tabs (112a, 112b), which can be attached by welding. Resistor tab 112a and anode tabs 114a of anode electrodes 114 are electrically connected to low-resistance negative terminal LoR(−) 120 to form a low electrical resistance circuit. Resistor tab 112b is electrically connected to high-resistance negative terminal HiR(−) 122 to form a high electrical resistance level circuit that is activated by switch 124. Cathode tabs 118a of cathode electrodes 118 are electrically connected together and to positive terminal 126. In this particular example, switch 124 is a thermally activated switch that can electrically connect or disconnect LoR(−) terminal 120 and HiR(−) terminal 122.

The anode-separator-cathode-resistor sheet assembly can be placed in an appropriate package, e.g., in a casing of a pouch cell and filled with electrolyte. In this embodiment, the anode-separator-cathode-resistor sheet assembly is contained in casing 140. The negative and positive terminals can be electrically connected to an external circuit 128a and 128b.

In sum, the rechargeable battery illustrated in FIG. 1A features three terminals on the outside, two negative terminals, LoR(−) and HiR(−), and one positive terminal (+). The two negative terminals, LoR(−) and HiR(−), are further connected by a temperature-sensitive switch immediately outside of the battery. In operation, when the battery temperature is above $T_1$, the switch is CLOSED and the battery current bypasses the resistor sheets since current prefers to flow through the low-resistance circuit. In this case, the battery operates between the terminals (+) and LoR(−), exhibiting a low internal resistance. When the battery temperature falls below $T_1$, the switch is made OPEN, leaving the terminals (+) and HiR(−) operative. This forces the battery current to flow through the resistor sheets and hence exhibits high internal resistance. For example, when the battery temperature is below a normal range, such as below about 5° C. or in subfreezing environments, the internal resistance of the battery becomes several-fold higher due to the presence of the resistor sheets in the current flow path. Once operated or activated, there is intense internal heating (as the battery's heat generation is proportional to its internal resistance), which leads to rapid rise of the battery temperature to a point that triggers the temperature-sensitive switch to CLOSED. The CLOSED switch immediately enables the LoR(−) terminal to be operative and lowers battery internal resistance. The combination of low internal resistance and high internal temperature substantially improves power and energy output of the battery despite operating in subfreezing environments.

Another embodiment is to place a switch between the positive terminal and HiR(−) terminal of an ohmically modulated battery. When the battery temperature is above $T_1$, the switch is OPEN and the battery operates between the positive and LoR(−) terminals and the battery current bypasses the resistor sheets, exhibiting a low internal resistance. When the battery temperature falls below $T_1$, the switch is made CLOSED while leaving the positive and LoR(−) terminals at open circuit. This forces the battery current to flow through the resistor sheets and hence rapid internal heating. Once the battery temperature rises to a point, the temperature-sensitive switch is triggered to OPEN.

Figure 1B:
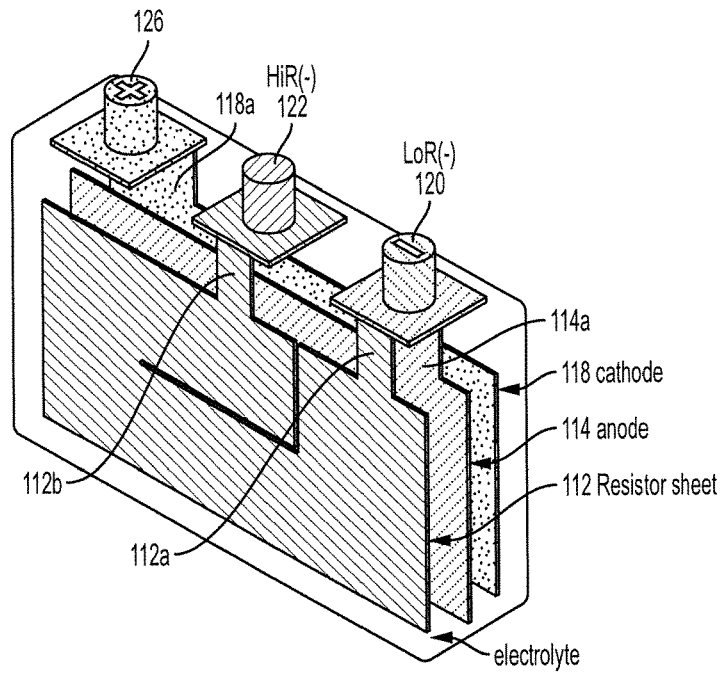
FIG. 1B is a schematic of a three-terminal ohmically modulated battery in a prismatic configuration according to an embodiment of the present disclosure

FIG. 1B shows another, partial illustration of the battery described for FIG. 1A. FIG. 1B shows a three-terminal ohmically modulated battery in a prismatic configuration having cathode electrode 118 and resistor sheet 112 adjacent anode electrode 114. The cell would further include electrolyte and a separator, which are not shown for illustrative convenience. Cathode electrode 118 includes tab 118a, resistor sheet 112 includes tabs 112a and 112b and anode electrode 114 includes tab 114a. The battery further includes one low-resistance negative terminal LoR(−) 120 and one high-resistance negative terminal HiR(−) 122, switch 124 and positive terminal (+) 126. The elements of the battery shown in FIG. 1B are electrically connected as described for FIG. 1A.

Figure 1C:
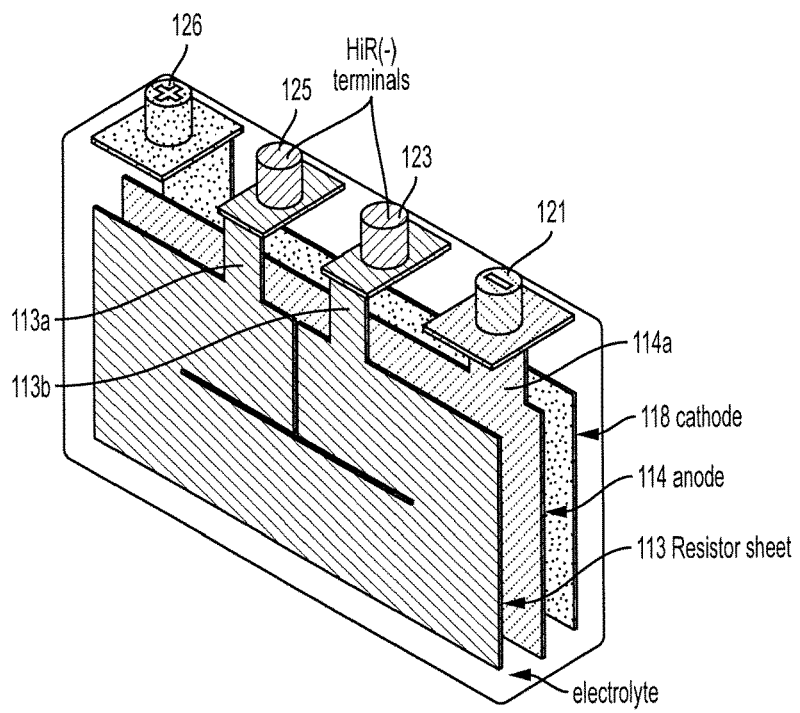
FIG. 1C is a schematic of a four-terminal ohmically modulated battery wherein two tabs of a resistor sheet form two HiR(−) terminals independently from the LoR(−) terminal, according to an embodiment of the present disclosure.

FIG. 1C shows another arrangement for the battery described in FIG. 1A. In this embodiment, the battery is in a prismatic configuration. As shown in FIG. 1C, the ohmically modulated battery can be configured with four terminals, e.g., positive terminal 126, low resistance negative terminal LoR(−) 121, and two high resistance terminals HiR(−) 123, 125. Resistor sheet 113 includes two tabs (113a, 113b) which form two HiR(−) terminals (123, 125) which is independent from the LoR(−) terminal 121. One of the HiR(−) terminals can be connected externally with the LoR(−) terminal, essentially reducing this 4-terminal battery into the 3-terminal battery shown in FIG. 1B. Or, one of the HiR(−) terminals can be electrically connected to one of the HiR(−) terminals from an adjacent cell in a multi-cell battery or module, forming a serially connected plurality of resistor sheets. The plurality of resistor sheets can then be connected into a multi-cell circuit by using only one switch.

While the battery in FIG. 1A is illustrated with three unit cells and two resistor sheets electrically connected in parallel and one switch for activating the battery in the high or low resistance mode, the ohmically modulate rechargeable battery of the present disclosure can have additional modules and/or additional unit cells. The battery can include additional resistor sheets and switches. For example, the battery can comprise more than one module or pack of cells where the cells in the module are adjacent each other and electrically connected to each other in a parallel or in a series arrangement or combinations thereof. The battery can include a plurality of resistor sheets that are electrically connected to each other in series or in parallel and located between adjacent cells in a module and plurality of thermally activated switches to operate the battery in a high or low resistance mode.

Figure 2:
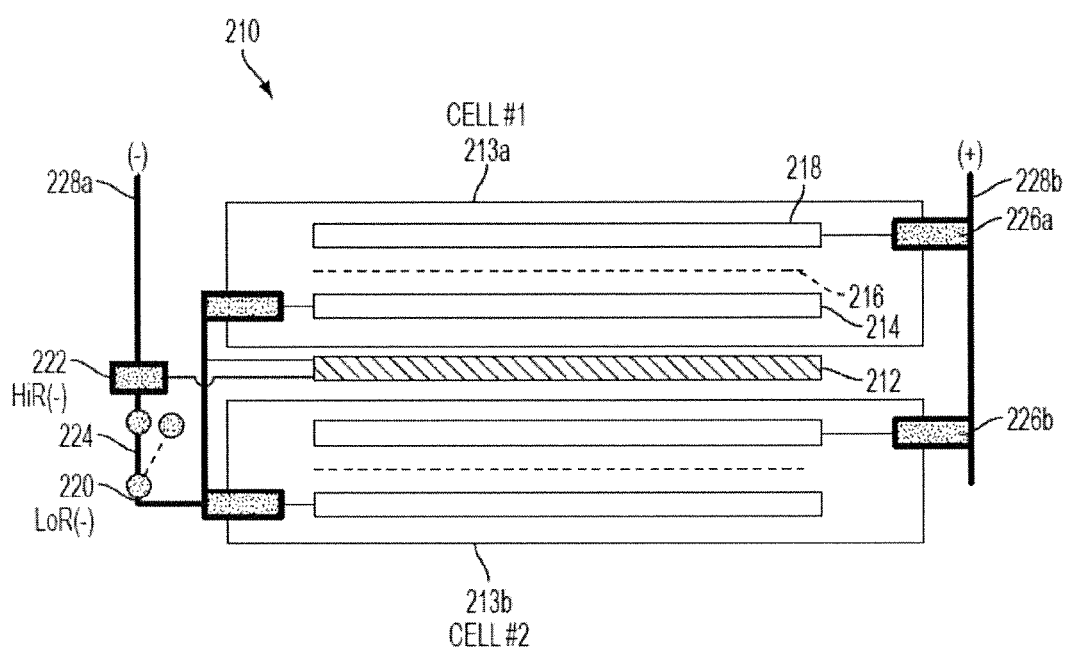
FIG. 2 is a schematic showing construction of a twin-cell battery module with one resistor sheet/foil between the two cells, i.e. outside each cell casing without direct contact with battery electrolyte according to an embodiment of the present disclosure.

In other embodiments of an ohmically modulated battery, a rechargeable battery can be configured by placing one or more resistor sheets outside a cell of the battery. For example, with a battery module including multiple cells, the one or more resistor sheets can be sandwiched between two adjacent cells within the battery module. FIG. 2 illustrates such an embodiment.

As shown in FIG. 2, battery module 210 includes resistor sheet 212 positioned between two cells 213a and 213b. The resistor sheet is preferably positioned between the cells to provide even heating of the cells and battery module, such as interposed tightly between two cells. Each cell includes anode electrodes 214, separators 216 and cathode electrodes 218. Battery module 210 further includes one low-resistance negative terminal LoR(−) 220 which is electrically connected to each cell of the module and one high-resistance negative terminal HiR( ) 222, which is electrically connected to the resistor sheet. The battery module also includes switch 224 and positive terminals (+) 226a and 226b. The negative and positive terminals can be electrically connected to an external circuit 228a and 228b.

In sum, the rechargeable battery illustrated in FIG. 2 features two-terminal cells in which one terminal (in this embodiment the negative terminal) is electrically connected to a switch which is further electrically connected to a resistor sheet. The rechargeable battery module 210 of FIG. 2 can be operated in the same manner as described for FIG. 1.

While battery module 210 in FIG. 2 is illustrated as a twin-cell module with one resistor sheet between the two cells, ohmically modulated batteries of the present disclosure can have additional cells and/or modules and/or resistor sheets and/or switches. For example, the battery module can have 4, 5 or 6 cells with one or more resistor sheets positioned between cells and around other positions near the cells. The battery can have additional modules with one or more resistor sheets positioned between modules and around other positions near the modules. The battery can have additional switches to connect the additional resistor sheets or one switch connecting all of the resistor sheets. The cells and/or the module can be electrically connected to each other in a parallel or in a series arrangement or combinations thereof. The resistor sheets can also be electrically connected to each other in series or in parallel.

All afore-described battery designs are applicable to rechargeable batteries such as Li-ion, nickel-metal hydride, lead-acid, etc. Advantageously, the rechargeable battery of the present disclosure can be implemented for all battery chemistries, such as rechargeable lithium ion, nickel-metal hydride, or advanced lithium batteries such as lithium-sulfur, lithium-air batteries or all solid-state batteries, and for all form factors, either pouch, cylindrical, prismatic or angular. The cell structure can accommodate rolled electrode and stacked electrode designs, among others.

Fast Charging at Low Temperatures

Another advantage of ohmically modulated rechargeable batteries is that they can be configured for fast charging at low temperatures. Preferably, the ohmically modulated batteries can be charged within a period of about 20-30 minutes at low temperatures without causing lithium plating or other appreciable degradation. The ohmically modulated battery can also advantageously be charged by regenerative power for simultaneous electric charging and internal heating.

For example in one embodiment of the present disclosure, an ohmically modulated battery can be included in a charging control system. The system can include a temperature sensor configured to monitor a temperature of the battery and a controller electrically connected to the temperature sensor that can receive inputs from the sensor and is programmed to determine whether to charge the battery in a low temperature resistance protocol or another protocol, e.g. a second protocol, based on the input from the temperature sensor.

The system can include additional components, individually or in combination, such as one or more of a voltage sensor electrically connected to the battery, e.g., a voltage sensor electrically connected to either the low-resistance terminal and or the high resistance terminal of the ohmically modulated battery; a current sensor electrically connected to the battery and capable of measuring current flowing through the battery; and/or a generator electrically connected to the battery and capable of charging the battery. The generator can be used to capture kinetic energy, such as in regenerative braking in vehicles, and charge the battery with such energy. With these additional optional components, the controller is capable of receiving inputs from the temperature sensor, the one or more voltage sensors and the current sensor and is capable of determining whether to charge the battery based on said inputs. Advantageously, the controller is further capable of setting the battery to a high resistance level or a low resistance level based on the temperature of the battery in certain embodiments.

In practicing certain embodiments of the present disclosure, an ohmically modulated rechargeable battery can be charged under a low temperature charging protocol (LTCP) when the battery is in a high resistance mode, e.g., when the temperature of the battery is below a predetermined charge temperature ($T_{CG1}$). In addition, the battery can be charged under another or a second protocol (e.g. a normal charging protocol that is used at normal operating temperatures) when the battery is in a low resistance mode. LTCPs include charging the battery under constant voltage, and/or at a constant current (I) and/or at a constant charging power (P) and combinations thereof. In one embodiment of the present disclosure, the LTCP includes: (i) charging the battery at either a constant voltage or a constant charging power (P); and (ii) followed by charging the battery at a constant current. Charging the battery at the constant current can occur when the charging current reaches or exceeds a predetermined maximum charge current ($I_{max}$). Further, the constant voltage can be determined from either the low-resistance terminal voltage $V_{LoR}$ and/or the voltage of the battery. The LTCP also can include charging the battery under a pulse voltage and/or pulse power and/or pulse current and combinations thereof. Charging under the second protocol when the battery is in a low resistance mode can include a constant current-constant voltage protocol, for example.

Figure 3A:
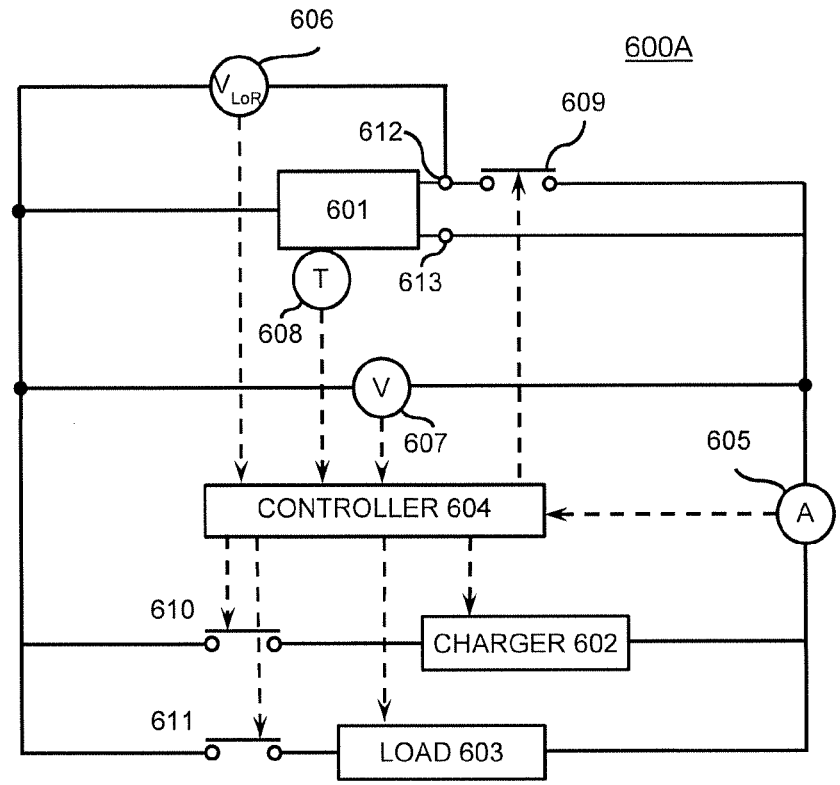
FIG. 3A is a circuit diagram depicting a battery charging control system, according to an embodiment of the present disclosure.

FIG. 3A illustrates a charging control system 600A that supports fast charging of an ohmically modulated battery at low temperatures in accordance with an embodiment of the present disclosure. Charging control system 600A includes ohmically modulated battery 601. In a preferred embodiment, lithium-ion is used as the cell chemistry for battery 601. However, the control system is applicable to other cell chemistries as well.

As shown in FIG. 3A, battery 601 has one positive terminal (not shown) and two negative terminals 612 and 613, wherein 612 is the low-resistance negative terminal LoR(−) and 613 is the high-resistance negative terminal HiR(−). Switch 609 is electrically connected to LoR(−) terminal 612 and HiR(−) terminal 613. LoR(−) terminal 612 is engaged when switch 609 is on, and HiR(−) terminal 613 is engaged when switch 609 is off. Switch 609 is operated by controller 604 in the present embodiment. Battery 601 is connected to charger 602 through switch 610 and to load 603 through switch 611. Battery 601 is also connected to a current sensor 605 for measuring charging current, a temperature sensor 608 for detecting a temperature of battery 601, and two voltage sensors 606 and 607. Voltage sensor 606 is connected to low-resistance negative terminal 612 for monitoring low-resistance terminal voltage $V_{LoR}$ of battery 601. Voltage sensor 607 is connected to high-resistance negative terminal 613 for measuring the voltage V of battery 601.

In operation, controller 604 receives information about charging/discharging current signal I (positive for charging, negative for discharging) from current sensor 605, temperature signal T from temperature sensor 608, battery low-resistance voltage signal $V_{LoR}$ from voltage sensor 606 and battery voltage signal from voltage sensor 607. The controller 604 controls charging operation of battery 601 by sending commands to charger 602, load 603, switches 609, 610 and 611 based on information received and charge algorithms.

The operation of controller 604 during the charging process is described with reference to the flowchart in FIG. 4 below.

Figure 4:
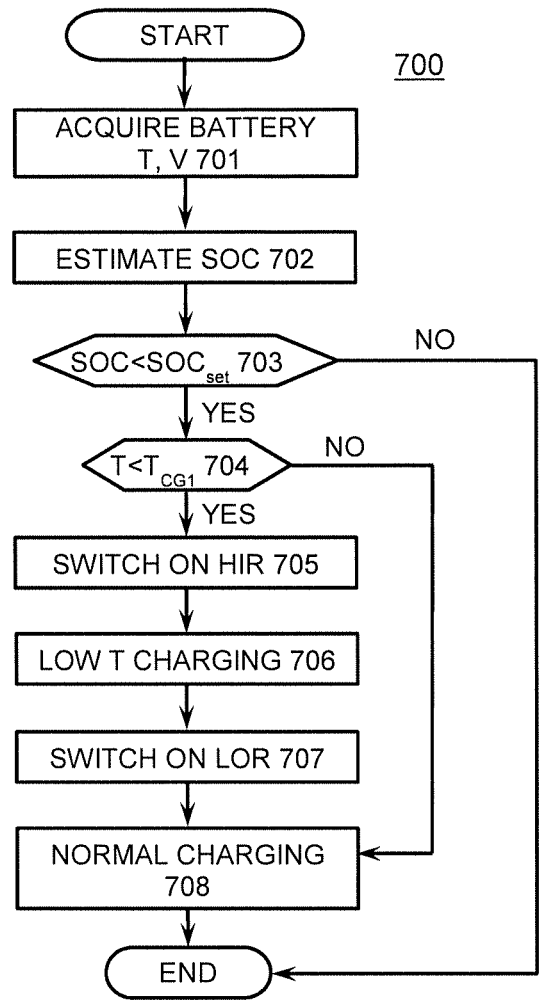
FIG. 4 is a flowchart illustrating a method for charging OMB using battery charging control system according to an embodiment of the present disclosure.

FIG. 4 presents a flow chart illustrating the charging process 700 in accordance with an embodiment of the present disclosure. At step 701 of this flow chart, after turning off switch 610 and 611, controller 604 acquires the temperature T from temperature sensor 608 and open circuit voltage (OCV) from voltage sensor 606 or 607. At step 702, controller 604 estimates the state of charge (SOC) of the battery 601. In one embodiment, this estimation is accomplished by accessing a lookup table wherein OCV-SOC correlation is stored. The lookup table may be part of controller 604, or be stored in a SOC estimator, which receives voltage signal from voltage sensors and return estimated SOC using the lookup table to controller 604.

At step 703, controller 604 makes a first determination as to whether battery 601 should be charged by comparing estimated SOC to a predetermined $SOC_{set}$. When the battery SOC is lower than the predetermined $SOC_{set}$, process 700 proceeds to step 704. Otherwise, battery 601 should not be charged and charging process 700 ends.

At step 704, controller 604 makes a second determination regarding charging operations based on the battery temperature signal from temperature sensor 608. When the battery temperature T is lower than a predetermined charge temperature ($T_{CG1}$), process 700 proceeds to step 705 where low temperature charging operations are conducted. Otherwise, process 700 proceeds to step 708 and battery 601 is charged in a conventional manner, where normal charging or fast charging is used. In an embodiment, the predetermined charge temperature $T_{CG1}$ has a value that is between about 5° C. and 25° C., preferably between about 20° C. and 25° C. In one non-limiting embodiment of the present disclosure, the predetermined charge temperature equals to about 25° C. That is, when a temperature of the battery is below about 25° C., the battery is charged in the high resistance mode.

At step 705, controller 604 sends a signal to switch 609 to engage the high-resistance negative terminal HiR(−) so that battery 601 operates at high-resistance mode ($R_2$). The internal resistance of the battery becomes several-fold higher due to the presence of the resistor sheets in the current flow path, which enables a rapid rise of battery temperature during operation owing to intense internal heating. The rapid temperature rise of battery 601 can be further accelerated by employing optimized charging methods described in the embodiments below.

At step 706, one or more LTCPs can be implemented, which is further exemplified in the flowcharts of FIGS. 5-10, for example.

After low temperature charging and as soon as battery temperature reaches $T_{CG1}$, process 700 proceeds to step 707 in which controller 604 sends a signal to switch 609 to engage the low-resistance negative terminal LoR(−). Battery 601 then operates at normal internal resistance level in the near normal temperature range.

At step 708, battery 601 is charged by a second protocol, e.g. a normal charging protocol, such as a constant current, constant voltage (CC-CV) protocol. Such CC-CV protocols include charging at a constant current of about 1 C or higher and a constant voltage of about $V_{set}$, wherein $V_{set}$ is a predetermined voltage. Also, charging at 2 C or greater rates can be implemented for fast charging under the normal charging protocols. Normal charging continues until battery 601 is charged to a specified SOC, the determination of which is implemented by checking the cut-off conditions.

For a CC-CV protocol, the charging stops until battery voltage is equal to the specified charge voltage and the charge current is below a predetermined threshold value.

Figure 5:
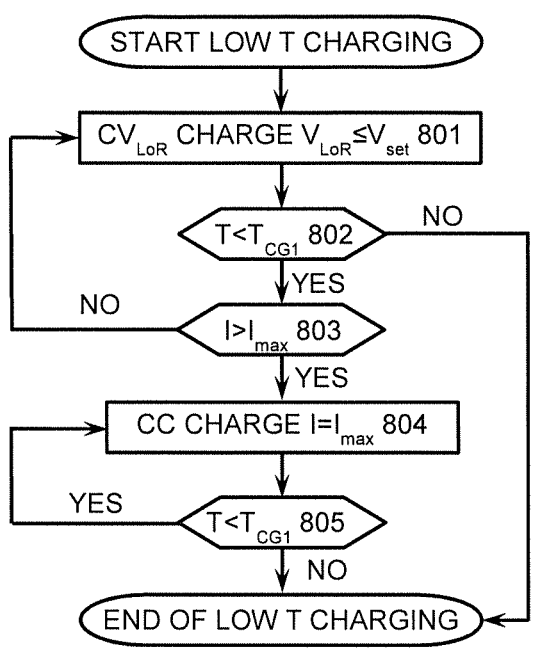
FIG. 5 is a flowchart illustrating a method ($CV_{LoR}$-CC) for low temperature charging according to an embodiment of the present disclosure.

In one embodiment of the present invention, a low temperature charging protocol (LTCP), as shown in FIG. 5, is named labeled $CV_{LoR}$-CC. This charging protocol starts with step 801, where the voltage $V_{LoR}$ (low-resistance terminal voltage), measured by voltage sensor 606, is maintained at a constant level. This constant voltage level is less than or equal to the voltage level $V_{set}$, which is the open circuit voltage of battery 601 at predetermined $SOC_{set}$.

A timer is set (not shown) at the beginning of low temperature charging to count charging time. Battery temperature and current are monitored periodically by receiving signals from temperature sensor 608 and current sensor 605.

At step 802, controller 604 determines whether battery temperature T reaches the predetermined temperature $T_{CG1}$. When $T \geq T_{CG1}$, i.e., when battery temperature rises to the predetermined level where normal charging is possible, low temperature charging stops. Otherwise, when $T < T_{CG1}$, the low temperature charging protocol continues and proceeds to step 803.

During $CV_{LoR}$ charging, the battery's temperature increases and its internal resistance reduces. It is thus expected that the charging current may rise beyond an allowable level. In order to prevent damage from the high current to the battery, charging current is checked periodically at step 803. The controller 604 determines whether charging current I exceeds a predetermined maximum charge current ($I_{max}$). This value is typically set by a battery manufacturer for a particular battery. When charging current I is greater than $I_{max}$, the charging current is limited to $I_{max}$ and the charging protocol switches to constant current (CC) mode (step 804). Otherwise, the charging process goes back to step 801 where $CV_{LoR}$ protocol is used.

In the case that charging switches to CC mode (step 804), the temperature of battery 601 is checked periodically (step 805). At step 805, controller 604 compares battery temperature with the predetermined temperature $T_{CG1}$. When T is lower than $T_{CG1}$, then charging process goes back to step 804. On the other hand, when T is higher than or equal to $T_{CG1}$, then low temperature charging process is completed.

In another embodiment of the low temperature charging method, as shown in FIG. 5, the protocol is termed as CV-CC. This charging method is configured identically to $CV_{LiR}$-CC charging protocol as shown in FIG. 5, except for the constant voltage charging step 901, wherein the voltage V measured by voltage sensor 607 (battery voltage), instead of $V_{LoR}$ measured by voltage sensor 606, is maintained at a constant level. Because of the high resistance at the high resistance terminal, battery voltage V is much higher than low-resistance terminal voltage $V_{LoR}$. The constant voltage level V for charging is higher than $V_{set}$ (the open circuit voltage of battery 601 at predetermined $SOC_{set}$). In the preferred embodiment, charging voltage V is no less than about 4V per cell, e.g., greater than or equal to about 5V per cell, to achieve rapid heating of battery 601 while charging.

Figure 7:
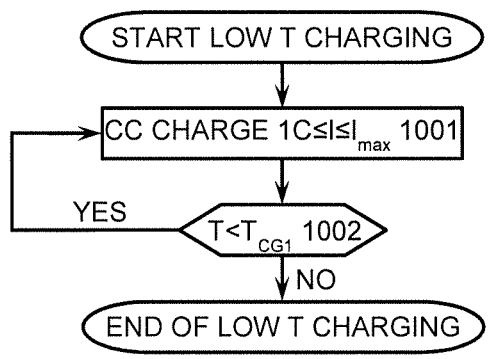
FIG. 7 is a flowchart illustrating a method (CC) for low temperature charging according to an embodiment of the present disclosure.

In another embodiment of the low temperature charging protocol, as shown in FIG. 7, the method is named as CC charging method. At step 1001, current signal measured by current sensor 605 is maintained at a constant level to achieve constant current (CC) charging. The charging current is in a range of less than or equal to about $I_{max}$ for battery life and safety concern, and preferably larger than or equal to a about 1 C rate to undertake fast charging and induce intense internal heating of battery 601. For example, the constant current under this protocol is in the range of about 1 $C \leq I \leq I_{max}$, e.g., 2 $C \leq I \leq I_{max}$. A timer is set (not shown) at the beginning of charging to count charging time. Battery temperature is monitored periodically by receiving signals from temperature sensor 608. At step 1002, the controller 604 determines whether battery temperature T reaches the predetermined charge temperature $T_{CG1}$. When $T \geq T_{CG1}$, i.e., when battery temperature rises to the predetermined level where normal charging or fast charging is possible, low temperature charging process stops. Otherwise, when $T < T_{CG1}$, charging process goes back to step 1001 where CC protocol is used.

Figure 8:
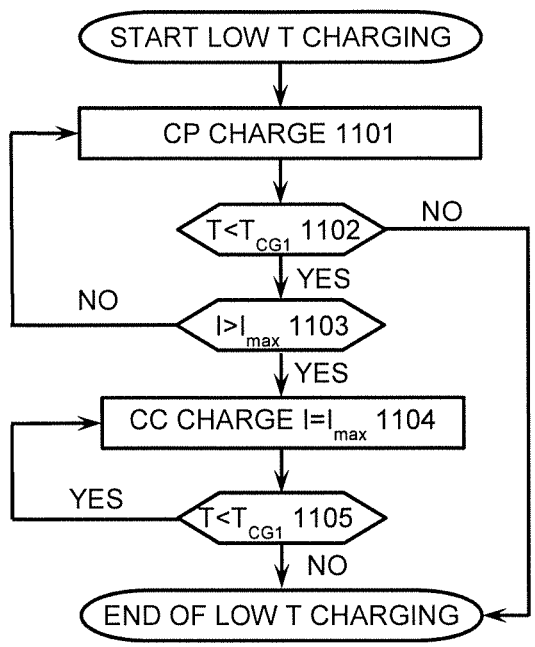
FIG. 8 is a flowchart illustrating a method (CP-CC) for low temperature charging according to an embodiment of the present disclosure.

In another embodiment of a LTCP, as shown in FIG. 8, the protocol is labeled as CP-CC. This charging method is configured identically to CV-CC charging method as shown in FIG. 5, except for the constant power charging step 1101, wherein charging power (battery voltage V times current I), instead of battery voltage V, is maintained at a constant level. The charging power is selected to incur intense internal heating of the battery such that battery voltage decreases during CP charging period in spite of increasing SOC. Accordingly, charging current is increasing and limited by $I_{max}$. This CP-CC charging method serves to prevent charging current from quickly reaching its maximum value and thus reduce the risk of lithium plating. In the preferred embodiment of the invention, charging power P is greater than the product of about 1 C charging current and about 4V charging voltage, e.g., greater than about 2 C charging current and about 5V charging voltage.

Figure 9:
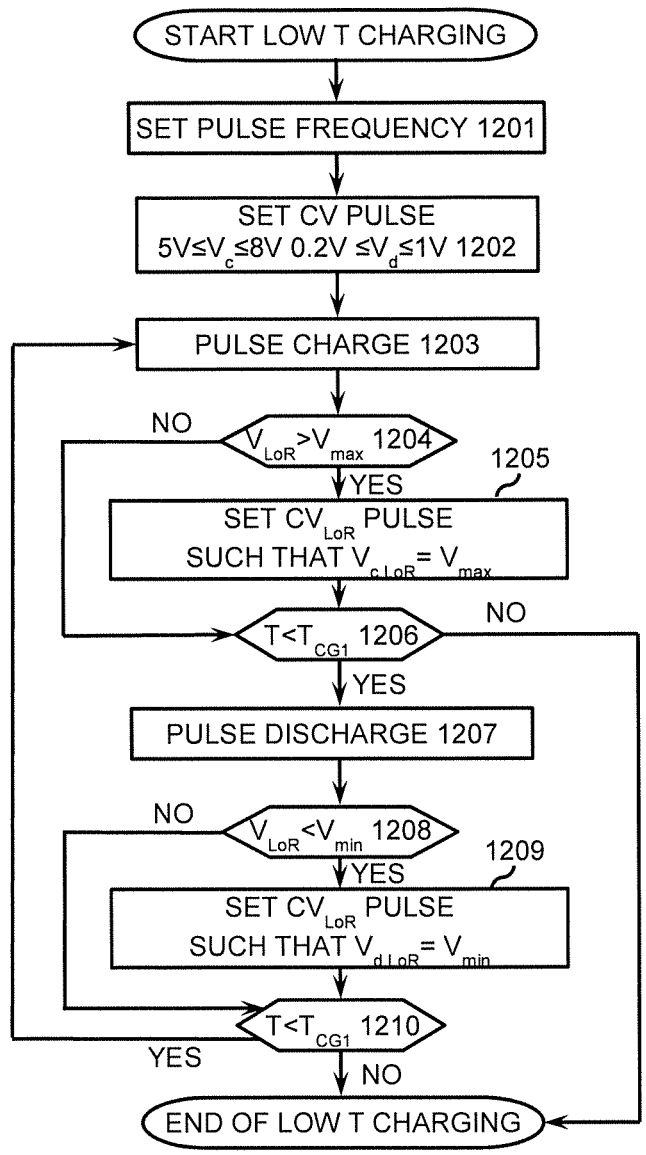
FIG. 9 is a flowchart illustrating a method (PV) for low temperature charging according to an embodiment of the present disclosure.

In another embodiment of a LTCP, as shown in FIG. 9, the method is termed as pulse voltage (PV) charging method, wherein forward and reverse (charge and discharge) voltage pulses are applied on battery 601 over consecutive periods. While this protocol is expressed as PV, it can also be expressed as pulse power using the same process.

The PV charging process begins with setting pulse frequency at step 1201. In a preferred embodiment for this protocol, the pulse frequency ranges between about 0.05 Hz to about 10 Hz. Pulses with frequency below this range induces large concentration polarizations in the electrolyte and solid phase of the battery. Pulses with frequency above this range gives rise to electrode exfoliation and electrolyte breakdown. Accelerated battery degradation is expected in both of the two cases.

Step 1202 sets the magnitudes of charge and discharge voltage pulses. The pulse voltage measured by voltage sensor 606, which is equal to the high-resistance terminal voltage 607 because battery is operated in the high resistance mode, is maintained at a constant level. In a preferred embodiment for this protocol, the voltage of the charge pulse ranges between about 5V and about 8V per cell, and the voltage of the discharge pulse ranges between about 0.2V and about 1V per cell. These voltage values are set to induce intense internal heating of battery, and at the same time prevent battery from damage.

At step 1203, constant voltage pulse charge operation at set frequency and magnitude is executed. Right after this charge pulsing, controller 604 makes a determination at step 1204 based on the low-resistance terminal voltage $V_{LoR}$ received from voltage sensor 606 and the maximum operating voltage of the battery $V_{max}$, which is greater than or equal to the aforementioned $V_{set}$ (the open circuit voltage of battery 601 at predetermined $SOC_{set}$). When $V_{LoR} \leq V_{max}$, the constant voltage pulse charge protocol maintains and the charging process branches to step 1206 and when $V_{LoR} > V_{max}$, i.e., the maximum operation voltage for battery materials is exceeded, the charging process proceeds to step 1205. At step 1205, to prevent $V_{LoR}$ from exceeding $V_{max}$, controller 604 sets the pulse operation protocol (charge part only) to $V_{c,LoR}=V_{max}$ which will be implemented in the next consecutive period.

At step 1206, the controller 604 determines whether battery temperature T reaches the predetermined temperature $T_{CG1}$. When $T \geq T_{CG1}$, i.e., when battery temperature rises to the predetermined level where normal charging is possible, low temperature charging stops. Otherwise, when $T<T_{CG1}$, low temperature charging process continues and proceeds to step 1207.

At step 1207, constant voltage pulse discharge operation at set frequency and magnitude is executed. Right after this discharge pulse, controller 604 makes a determination at step 1208 based on the low-resistance terminal voltage $V_{LoR}$ received from voltage sensor 606 and the minimum operating voltage for battery materials $V_{min}$. When $V_{LoR} \geq V_{min}$, the constant voltage pulse discharge protocol maintains and the process branches to step 1210 and when $V_{LoR}<V_{min}$, the charging process proceeds to step 1209. At step 1209, to prevent $V_{LoR}$ from dropping below $V_{min}$, controller 604 sets the pulse operation protocol (discharge part only) to $V_{d,LoR}=V_{min}$ which will be implemented in the next consecutive period.

At step 1210, the controller 604 determines whether battery temperature T reaches the predetermined temperature $T_{CG1}$. When $T \geq T_{CG1}$, i.e., when battery temperature rises to the predetermined level where normal charging is possible, PV charging stops. Otherwise, when $T<T_{CG1}$, PV charging process continues and proceeds to step 1203.

Figure 10:
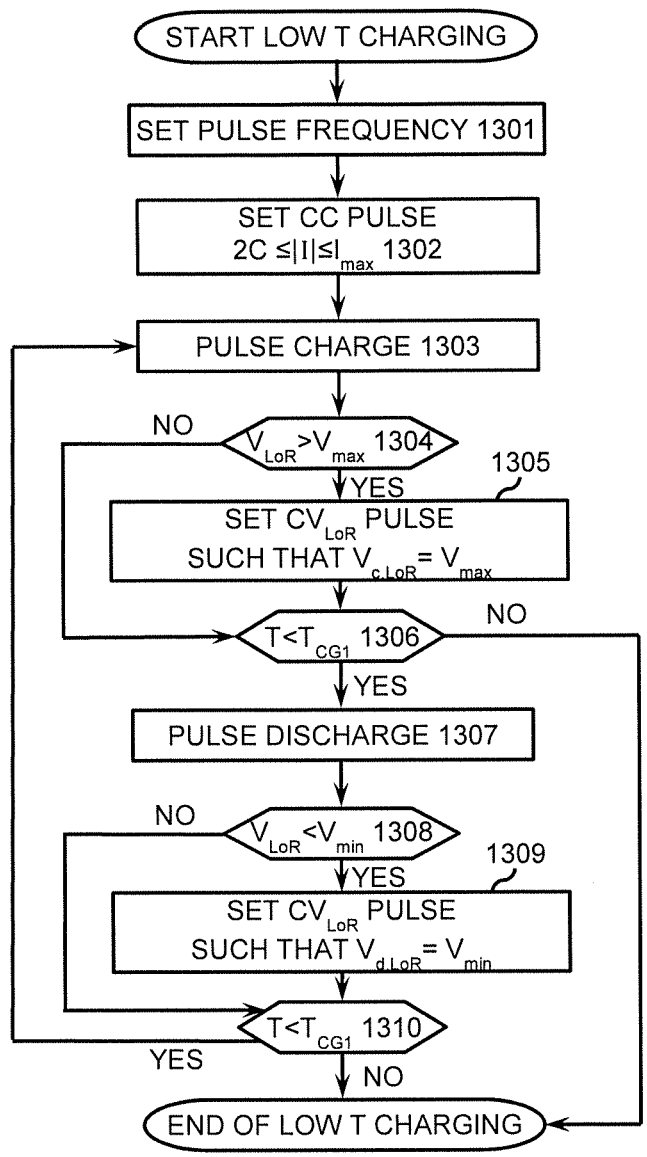
FIG. 10 is a flowchart illustrating a method (PC) for low temperature charging according to an embodiment of the present disclosure.

In another embodiment of the low temperature charging method, as shown in FIG. 10, the method is termed as pulse current (PC) charging method, wherein forward and reverse (charge and discharge) current pulses are applied on battery 601 over consecutive periods. This charging method is configured identically to pulse voltage (PV) charging method as shown in FIG. 9, except for step 1302, where constant current pulse, instead of constant voltage pulse, is used. The pulse current measured by current sensor 605 is maintained at a constant level. In the preferred embodiment, the magnitude of the current (both charge and discharge) ranges between about 2 C to about $I_{max}$. These current values are set to induce intense internal heating of battery, and at the same time prevent battery from unwanted damage. Further, the frequency of the charging and discharging pulse can range between about 0.05 Hz to about 10 Hz.

While only a few charging algorithms of the present invention are described via the specific embodiments above, they belong to a class of $I$-$V$-$V_{LoR}$-T based algorithms for batteries, which differ from charging algorithms based on I-V-T.

Regenerative Charging

In addition, ohmically modulated rechargeable batteries can also be charged with regenerative energy, e.g., electrical energy or power that is produced from the kinetic energy of a moving vehicle. For example, regenerative braking (also called regen) is the conversion of the vehicle's kinetic energy into electricity that recharges (regenerates) the onboard battery as the vehicle is slowing down and/or stopping. Such regenerative energy can be derived to capture braking energy in a vehicle such as in electric vehicles (EV), hybrid electric vehicles (HEV), and plug-in hybrid electric vehicles (PHEV), for example. In a charging control system that captures regenerative energy, the system includes a generator, e.g., a motor/generator to convert the kinetic energy to electrical power. In one embodiment of the present disclosure, a charging control system to capture regenerative energy includes an power regeneration system supplying regenerative power to the rechargeable battery; a battery control system to apply regenerative power to the rechargeable battery; a vehicle control system that (i) receives braking request and battery status, and (ii) determines whether to engage the power regeneration system based on battery status, and (iii) in response to the determination, engages the power regeneration system and forwards regenerative power to the rechargeable battery.

In practicing certain embodiments of the present disclosure, an ohmically modulated rechargeable battery can be charged with regenerative energy under a regenerative charging protocol (RCP) when the battery is in a high resistance mode, e.g., when the temperature of the battery is below a predetermined charge value ($T_{CG1}$). In addition, the battery can be charged under a second protocol (e.g. a normal charging protocol that is used at normal operating temperatures) when the battery is in a low resistance mode.

RCPs include, for example, charging the battery by applying a charging current to the battery in voltage controlled form or in power P controlled form or in current controlled for or combinations thereof. The voltage controlled form, power P controlled form and current controlled form can be either a constant value or a function of time. In one embodiment of the present disclosure, the RCP includes (i) charging the battery by applying a charging current to the battery in voltage controlled form or in power P controlled form, (ii) followed by charging the battery at a constant current; wherein the voltage controlled form is determined either at the low-resistance terminal voltage $V_{LoR}(t)$ of the battery or at the voltage of the battery V(t). Charging the battery at the constant current can occur when the charging current reaches or exceeds a predetermined maximum charge current ($I_{max}$). Charging under the second protocol when the battery is in a low resistance mode can include a constant current-constant voltage protocol, for example.

Figure 11:
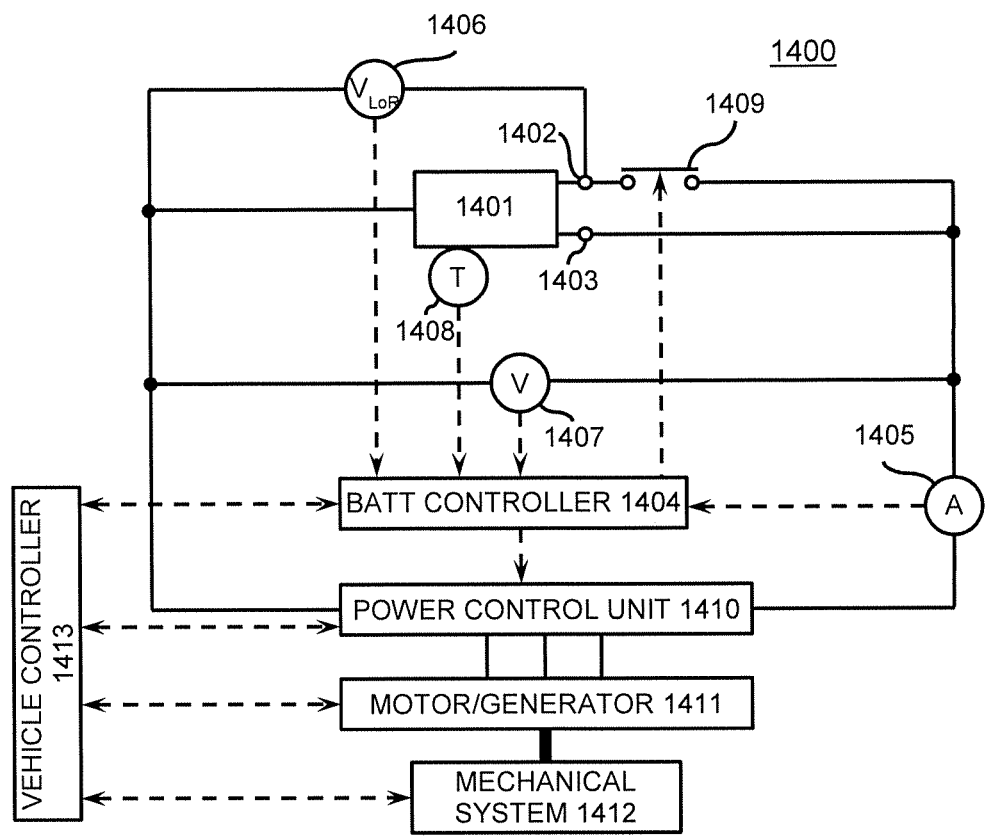
FIG. 11 is a diagram depicting regenerative charging system, according to an embodiment of the present disclosure.

FIG. 11 shows a simplified configuration of a regenerative charging system 1400 in accordance with an embodiment of the present disclosure. Such a system can be included in an electrically powered vehicle such as an EV/HEV/PHEV, for example.

Regenerative charging system 1400 includes ohmically modulated rechargeable 1401. In a preferred embodiment, lithium-ion is used as the cell chemistry for battery 1401. However, the control system is applicable to other cell chemistries as well.

The power control unit 1410, which is electrically connected to battery 1401, motor/generator 1411 and other units (not shown, such as engine-generator, 12V auxiliary electrical system etc.), performs the exchange and conversion of electric power among its connections. The power control unit 1410 includes without limitation an inverter and a rectifier (not shown).

When battery 1401 is used as a power source (discharging) to provide traction power for the vehicle, the inverter converts DC power supplied from battery 1401 to AC power for motor/generator 1411, which acts as an electric motor that generates traction torque and propels the vehicle through mechanical system 1412 (including clutch, transmission, crankshaft and wheels, among other components), and when battery 1401 is restoring energy (charging), the rectifier converts AC power from generator 1411 to DC power to charge battery 1401. Restoration of energy to the battery can occur when one of the associated events being regenerative braking, during which the vehicle is retarded by motor/generator 1411 which acts as a generator converting the kinetic energy of the vehicle to electric power.

In an embodiment of the present disclosure, battery 1401 has one positive terminal (not shown) and two negative terminals 1402 and 1403, wherein 1402 is the low-resistance negative terminal LoR(−) and 1403 is the high-resistance negative terminal HiR(−). Switch 1409 is electrically connected to LoR(−) terminal 1402 and HiR(−) terminal 1403. LoR(−) terminal 1402 is engaged when switch 1409 is on, and HiR(−) terminal 1403 is engaged when switch 1409 is off. The operation of switch 1409 is carried out by controller 1404.

Battery 1401 is electrically connected to current sensor 1405 for detecting the current flowing into and out of battery 1401, to temperature sensor 1408 for detecting temperature of the battery 1401, and to two voltage sensors 1406 and 1407. Voltage sensor 1406 is electrically connected to low-resistance negative terminal 1402 for monitoring low-resistance terminal voltage $V_{LoR}$ of the battery 1401. Voltage sensor 1407 measures the voltage V of the battery 1401.

The controller 1404 receives information about charging/discharging current signal I (positive for charging, negative for discharging) from current sensor 1405, temperature signal T from temperature sensor 1408, battery low-resistance voltage signal $V_{LoR}$ from voltage sensor 1406 and battery voltage signal from voltage sensor 1407, as well as the commands from vehicle controller 1413 regarding the battery operation mode (discharging, charging, regenerative charging or rest). Battery controller 1404 controls the operation of battery 1401 by sending commands to switch 1409 and power control unit 1410. It is also able to send requests to vehicle controller 1413, which coordinates the operations of vehicle components, including but not limited to battery controller 1404, power control unit 1410, motor/generator 1411 and mechanical system 1412.

The operation of battery controller 1404 and vehicle controller 1413 during the regenerative charging process is described with reference to the flowchart in FIG. 12, in accordance with an embodiment of the present invention. Assume that the vehicle is in operation. When the vehicle operator initiates a deceleration command by pressing the brake pedal, the vehicle controller 1413 signals battery controller 1404 to acquire battery temperature and state of charge (SOC). At step 1501, battery controller 1404 acquires the temperature T from temperature sensor 1408, estimates battery SOC by using SOC estimation algorithms or incorporating a SOC estimator and returns temperature and SOC information to vehicle controller 1413.

At step 1502, vehicle controller 1413 makes a determination as to whether regenerative charging should be performed. When battery SOC is lower than the predetermined $SOC_{RG}$, which is a SOC threshold above which regenerative charging may incur damage to battery 1401, vehicle controller 1413 signals vehicle's mechanical system 1412 to retard the vehicle via motor/generator 1411 where electric power is generated for charging battery 1401. When battery SOC is equal to or higher than $SOC_{RG}$, the vehicle controller 1413 either commands the mechanical system 1412 to use friction-based braking, or to use regenerative braking but forward the generated electric power to other system components (such as cabin cooling/heating, engine heating etc.) by commanding power control unit 1410.

At step 1503, battery controller 1404 makes a determination regarding regenerative charging operations based on the battery temperature from temperature sensor 1408. When the battery temperature T is lower than a predetermined temperature $T_{CG1}$, process 1500 proceeds to step 1504 where battery 1401 is charged at high resistance level for simultaneous internal heating and electric charging.

Otherwise, process 1500 proceeds to step 1506 and the battery 1401 is charged at low resistance level for maximum energy storage. In an embodiment, the predetermined charge temperature $T_{CG1}$ has a value that is between about 5° C. and 25° C., preferably between about 20 and 25° C. In one non-limiting embodiment of the present disclosure, the predetermined charge temperature equals to about 25° C. That is, when a temperature of the battery is below about 25° C., the battery is charged in the high resistance mode.

When battery temperature T is lower than the predetermined temperature $T_{CG1}$, process 1500 proceeds to step 1504, where battery controller 1404 determines whether switch 1409 is on. When the answer is YES, in other words, when battery 1401 operates at low resistance level, process 1500 then proceeds to step 1505 where battery controller 1404 commands switch 1409 to turn off and engage the high-resistance negative terminal HiR(−) so that battery 1401 operates at high-resistance level ($R_2$). The internal resistance of the battery becomes several-fold higher due to the presence of the resistor sheets in the current flow path, which enables rapid rise of battery temperature during operation owing to intense internal heating. When the answer is NO, in other words, when battery 1401 operates at high resistance level, no more action on switch 1409 is needed. Process 1500 jumps to step 1508 where regenerative charging is implemented.

When battery temperature T is greater than or equal to the predetermined temperature $T_{CG1}$, process 1500 proceeds to step 1506, where battery controller 1404 determines whether switch 1409 is on. When the answer is YES, in other words, when battery 1401 operates at low resistance level, no more action on switch 1409 is needed. Process 1500 jumps to step 1508 where regenerative charging is implemented. When the answer is NO, in other words, when battery 1401 operates at high resistance level, process 1500 then proceeds to step 1507 where battery controller 1404 commands switch 1409 to turn on and engage the low-resistance negative terminal LoR(−) so that battery 1401 operates at low-resistance level, which prevents battery 601 from overheating and allows more electric energy stored in battery 1401.

At step 1508, a regenerative charging protocol is implemented, which is further detailed in the flowcharts of FIGS. 13-16, for example.

Figure 13:
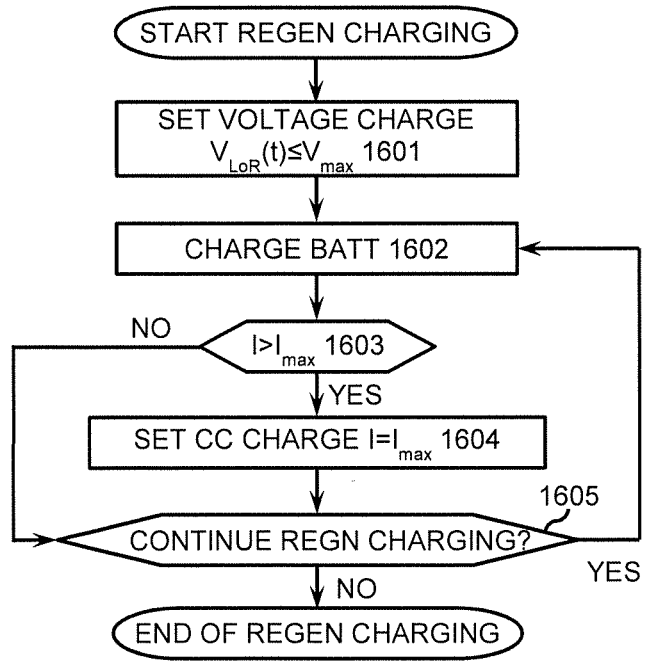
FIG. 13 is a flowchart illustrating a method ($V_{LoR}$-CC) for regenerative charging according to an embodiment of the present disclosure.

In one embodiment of the present disclosure and as shown in FIG. 13, a RCP labeled $V_{LoR}$(t)-CC is described. In this embodiment, when regenerative charging command is issued by vehicle controller 1413, the electric AC power is generated from generator 1411 and converted to DC power at appropriate voltage level by power control unit 1410. At step 1601, battery controller regulates the DC power from power control unit 1410 to battery 1401 in a voltage controlled form $V_{LoR}$(t), by monitoring the voltage signal from voltage sensor 1406. The voltage controlled form can be a constant voltage over time or a function of time, i.e., a set time. In one preferred embodiment, $V_{LoR}$(t) is less than or equal to $V_{max}$.

A timer is set (not shown) at the beginning of regenerative charging to count charging time. At step 1602, charge operation at set voltage level is executed for a specified time interval.

Right after this time interval, battery controller 1404 makes a determination at step 1603 based on the charging current I from current sensor 1405 and $I_{max}$. When $I \leq I_{max}$, the charge protocol maintains set charging mode and the charging process branches to step 1605. When $I > I_{max}$, i.e., the maximum charging current is exceeded, the charging process proceeds to step 1604. At step 1604, the charging current is limited to $I_{max}$ and the charging protocol switches to constant current (CC) mode where $I=I_{max}$, which will be implemented in the next charging interval.

At step 1605, a determination is made by battery controller 1404 as to whether regenerative charging continues, based on signal received from vehicle controller 1413. When the answer is YES, the charging process goes back to step 1602, where battery 1404 is charged in the next time interval. When the answer is NO, the regenerative charging process stops.

Figure 14:
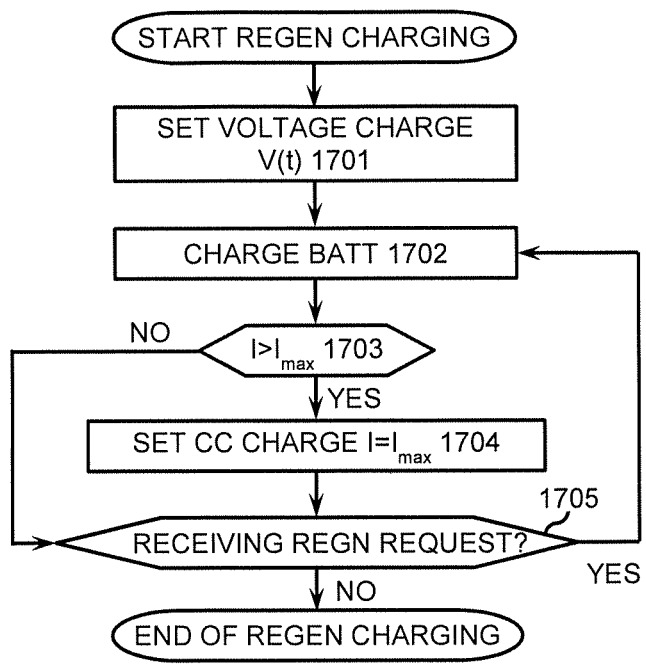
FIG. 14 is a flowchart illustrating a method (V-CC) for regenerative charging according to an embodiment of the present disclosure.

In another embodiment of the regenerative charging method, as shown in FIG. 14, the method is termed as V(t)-CC regenerative charging method. This charging method is configured identically to $V_{LoR}$(t)-CC regenerative charging method as shown in FIG. 13, except for the set voltage charge step 1701, wherein the voltage V measured by voltage sensor 1407 (battery voltage), instead of $V_{LoR}$ measured by voltage sensor 1406, is controlled. Because of the high resistance involved, battery voltage V is much higher than low-resistance terminal voltage $V_{LoR}$.

Figure 15:
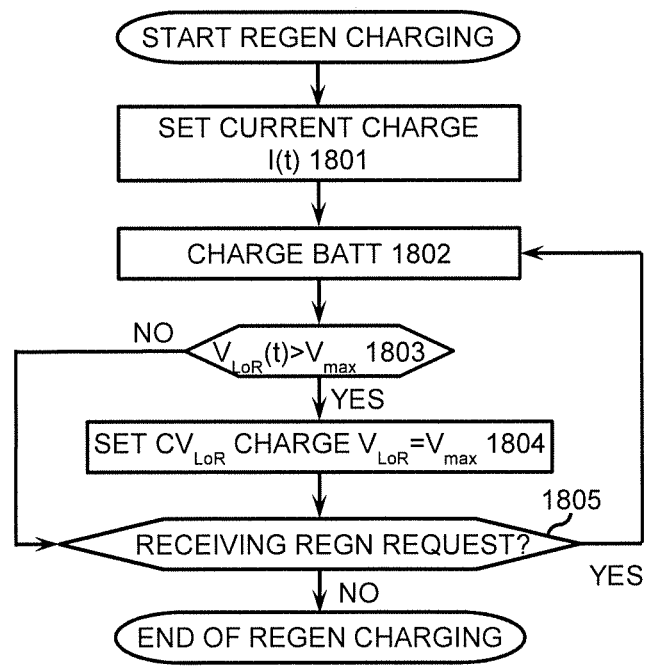
FIG. 15 is a flowchart illustrating a method (C-$CV_{LoR}$) for regenerative charging according to an embodiment of the present disclosure.

In another embodiment of a RCP, as shown in FIG. 15, the protocol is termed as C-$CV_{LoR}$. At step 1801, battery controller regulates the DC power from power control unit 1410 to battery 1401 in current controlled form I(t), by monitoring the current signal from current sensor 1405. In one preferred embodiment, I(t) is less than or equal to $I_{max}$. A timer is set (not shown) at the beginning of regenerative charging to count charging time. At step 1802, charge operation at set current level is executed for a specified time interval. Right after this time interval, battery controller 1404 makes a determination at step 1803 based on low-resistance terminal voltage $V_{LoR}$ from voltage sensor 1406 and $V_{max}$. When $V_{LoR} \leq V_{max}$, the charge protocol maintains set charging mode and the charging process branches to step 1805. When $V_{LoR} \geq V_{max}$, the charging process proceeds to step 1804. At step 1804, the low-resistance terminal voltage $V_{LoR}$ is limited to $V_{max}$ and the charging protocol switches to constant voltage ($CV_{LoR}$) mode where $V_{LoR}=V_{max}$, which will be implemented in the next charging interval. At step 1805, a determination is made by battery controller 1404 as to whether regenerative charging continues, based on signal received from vehicle controller 1413. When the answer is YES, the charging process goes back to step 1802, where battery 1404 is charged in the next time interval. When the answer is NO, the regenerative charging process stops.

Figure 16:
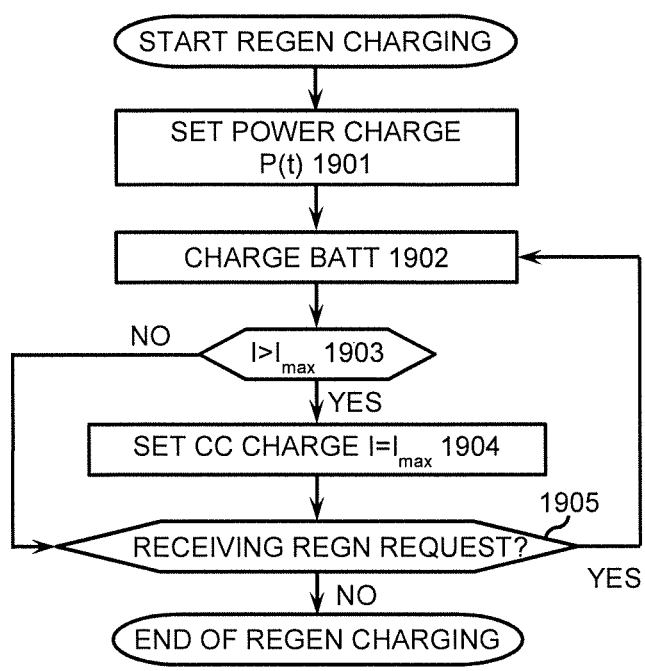
FIG. 16 is a flowchart illustrating a method (P-CC) for regenerative charging according to an embodiment of the present disclosure.

In another embodiment of the regenerative charging method, as shown in FIG. 16, the method is named as P(t)-CC regenerative charging method. This charging method is configured identically to V(t)-CC charging method as shown in FIG. 14, except for the set power charge step 1901, wherein charging power (the product of battery voltage V and charging current I), instead of battery voltage V, is controlled.

While only a few regenerative charging algorithms of the present invention are described via the specific embodiments above, they belong to a class of I-V-$V_{LoR}$-T based algorithms, which are novel and different from conventional charging algorithms based on I-V-T.

Fast Charging at Low Temperatures with Parallel Switch Arrangement

Figure 3B:
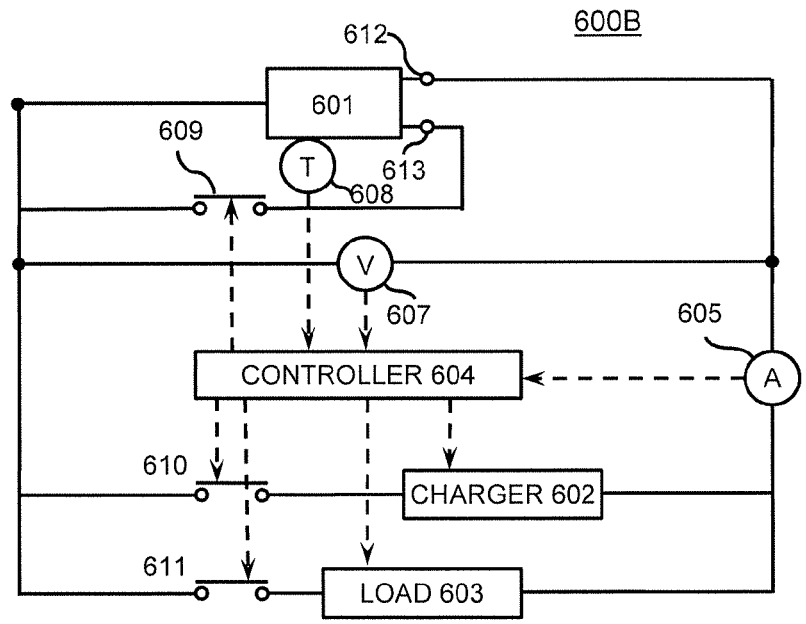
FIG. 3B is another circuit diagram depicting a battery charging control system, according to another embodiment of the present disclosure

FIG. 3B illustrates a charging control system 600B that supports fast charging of an ohmically modulated battery at low temperatures in accordance with another embodiment of the present disclosure. In this embodiment, switch 609 can electrically connect HiR(−) terminal 613 to the positive terminal of battery 601. Advantageously, this embodiment does not include a voltage sensor for monitoring low-resistance terminal voltage $V_{LoR}$ of battery 601, e.g., voltage sensor 606 is not included, since the voltage sensor 607 is sufficient for determining the voltage of the negative terminals and the battery.

All of the other components and connections shown in FIG. 3B are the same as in FIG. 3A, e.g., switch 609 is operated by controller 604, battery 601 is connected to charger 602 through switch 610 and to load 603 through switch 611 and battery 601 is also connected to a current sensor 605 for measuring charging current, a temperature sensor 608 for detecting a temperature of battery 601, and voltage sensor 607.

In operation, controller 604 receives information about charging/discharging current signal I (positive for charging, negative for discharging) from current sensor 605, temperature signal T from temperature sensor 608, and battery voltage signal from voltage sensor 607. The controller 604 controls charging operation of battery 601 by sending commands to charger 602, load 603, switches 609, 610 and 611 based on information received and charge algorithms.

In a low temperature charging protocol, switch 609 electrically engages battery 601 to charger 602 through the high-resistance terminal of the battery, i.e., the high resistance terminal 613 is connected by switch 609 to the positive terminal of the battery during an LTCP. With this design, the total charging current is split into two parallel paths: one going through the battery active materials and leaving terminal 612; and the other going into terminal 613 and through the one or more resistor sheets of the battery and then emerging through terminal 612. The partial current flowing through the resistor sheets generates heat which increases the interior temperature of the battery and hence helps the battery charge process. The circuit design in the embodiment, wherein the switch electrically engages a high-resistance terminal to a positive terminal of the battery during charging of the battery by a source of electrical current, advantageously allows changing at a lower voltage than when charging occurs only through the high resistance terminal during an LTCP.

In an embodiment of the present disclosure, a method of charging an ohmically modulated rechargeable battery includes charging the battery under a low temperature charging protocol (LTCP) by engaging a switch that is electrically connected to a HiR(−) terminal to a positive terminal of the battery when the battery is electrically connected to a source of electrical current that charges the battery. The battery can be charged under a second protocol, e.g. a normal charging protocol that is used at normal operating temperatures, by disengaging the switch.

EXAMPLE

The following example is intended to further illustrate certain preferred embodiments of the present invention and is not limiting in nature. Those skilled in the art will recognize, or be able to ascertain, using no more than routine experimentation, numerous equivalents to the specific substances and procedures described herein.

In this example an ohmically modulated battery was produced and tested under simulated conditions using an electrochemical-thermal coupled model. The details regarding such a model can be found in Ji et al., "Li-Ion Cell Operation at Low Temperatures", J. Electrochemical Society (2013) 160(4) A636-A649.

A pilot-production OMB battery of 20 Ah was produced in the form of a prismatic cell and made of lithium-nickel-manganese-cobalt (NMC) cathode and graphite anode. The battery included a resistor sheet sandwiched between two jelly roll electrode-separator assemblies. The resistor sheet gives rise to an additional high-resistance negative terminal, in addition to a positive terminal and a low-resistance negative terminal. The resistor sheet was in the shape of a resistor foil and made of stainless steel of 25 cm long, 6 cm wide and 11 um thick. Its resistance was approximately 0.045 Ohm and its weight is about 1.4 grams which is about 0.3% of the total battery weight. The switch made in the form of an electromechanical relay and driven by a temperature controller was positioned outside of the OMB.

A charging control system as described in FIG. 2 is built to demonstrate the fast charging methods at low temperatures. The predetermined temperature $T_{CG1}$ is set to 25° C. The maximum and minimum voltages for the battery materials are set at $V_{max}$=4.1V per cell, $V_{min}$=2.8V per cell. The battery's maximum allowable charge current $I_{max}$=3.5 C=70 A. The temperature sensor is realized in the form of several thermocouples mounted onto the battery. Prior to testing, the test battery is discharged to 25% SOC and then soaked for 5-6 hours in a thermal chamber set at −25° C. The target charge SOC is set at $SOC_{set}$=100%, which corresponds to $V_{set}$=4.1V/cell. A baseline cell without the resistor foil, the high-resistance terminal and the switch but remaining otherwise identical is also tested for a comparative study.

The battery (601 in the charging system FIG. 2) is charged from 25% SOC to 100% SOC using the charging method as described in flowchart 700 (FIG. 4), which comprises two stages: low temperature charging (step 706) and normal charging (step 708). At normal charging step 708, the battery 601 is charged by CC-CV protocol wherein 2.5 C current rate (50 A) is used during CC period and 4.1V/cell voltage until cut-off current of C/10 (2 A) is used during CV period. At low temperature charging step 706, six low temperature charging protocols were applied, namely $CV_{LoR}$-CC charging, CV-CC charging, CC charging, CP-CC charging, PV charging and PC charging as described in FIGS. 4-10, respectively, and tested. The evolutions of SOC, current, temperature, voltage and low-resistance terminal voltage $V_{LoR}$ of this 20 Ah OMB during the entire charging process for each low temperature charging protocol are shown in FIGS. 17-19.

Figure 17A:
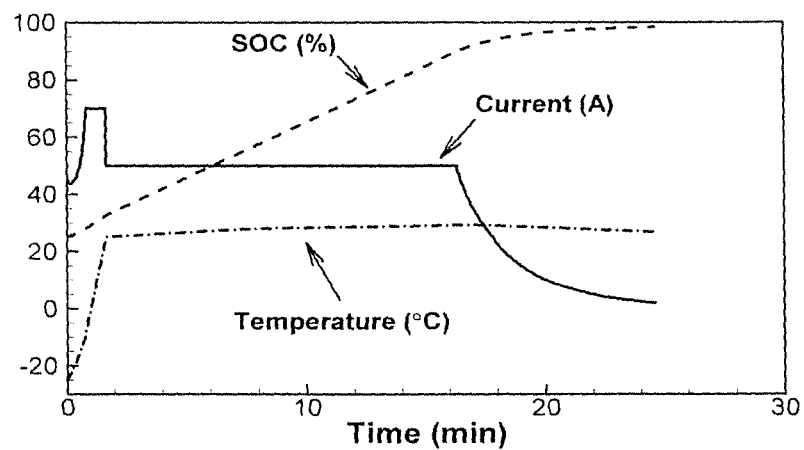
FIGS. 17A and 17B are graphs showing the results of charging an ohmically modulated battery according to an embodiment of the present disclosure. The charging protocols employed a $CV_{LoR}$-CC low temperature charging combined with CC-CV normal charging ($CV_{LoR}$ 4V CC $I_{max}$ when T<$T_{CG1}$, CC 2.5 C, CV 4.1V when T≥$T_{CG1}$).
Figure 17B:
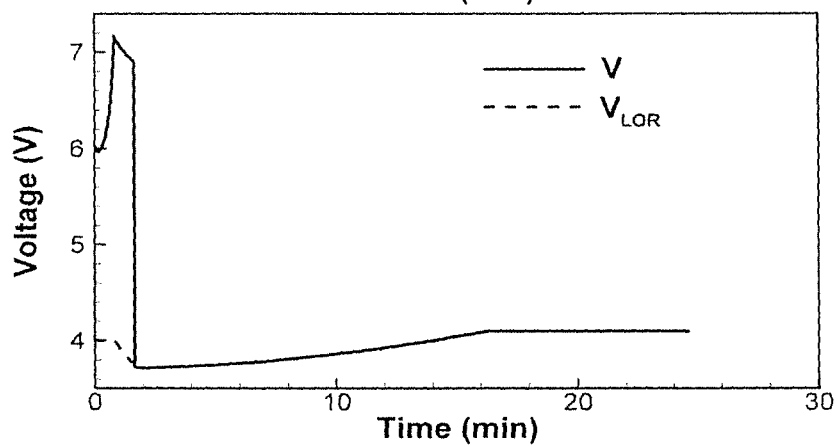

FIG. 17A and FIG. 17B show the evolutions of battery SOC, current, temperature and voltage obtained using $CV_{LoR}$-CC charging method ($V_{LoR}$=4.0V/cell, I=$I_{max}$) described in FIG. 5 for low temperature charging, followed by normal charging (CC-CV I=2.5 C, V=4.1V/cell). This method is able to charge the battery from 25% SOC to 100% SOC in 25 minutes from a temperature of −25° C. ambient. In addition, the low temperature charging period consumes only 99 s (49 s $CV_{LoR}$ charging and 50 s CC charging), during which battery temperature increases sharply from −25° C. to 25° C. as is observed from FIG. 17A. This rapid internal heating of battery is achieved by turning on battery's high-resistance level and applying high charge voltage (between 6V to 7.2V per cell from FIG. 17B), which create intense heating of the resistor foil embedded inside the battery. Moreover, as observed in FIG. 17B, the battery's low-resistance terminal voltage, within which all battery materials reside, stays below 4.0V and charging current stays below $I_{max}$=70 A, as controlled by $CV_{LoR}$-CC charging method, which helps to reduce or eliminate battery damage. When the battery temperature reaches 25° C., the controller switches the battery to the low-resistance mode. The battery is able to keep its temperature at the optimum level (around 25° C.) due to the balance between internal heat generation and heat dissipation. Staying at the optimum temperature enables continuous fast charging of the battery.

Figure 6:
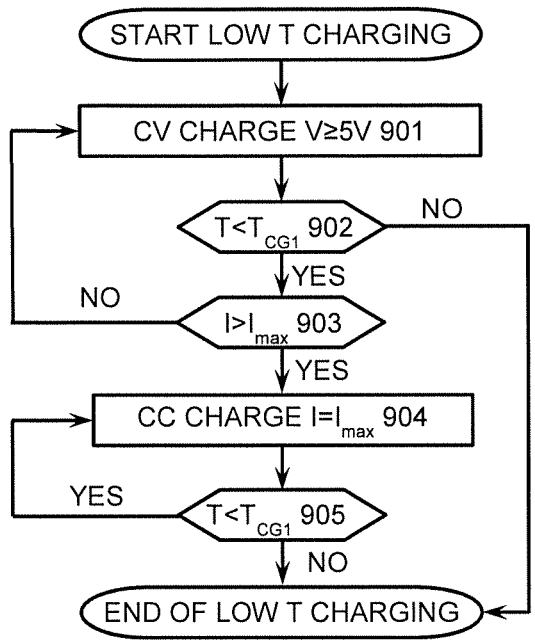
FIG. 6 is a flowchart illustrating a method (CV-CC) for low temperature charging as according to an embodiment of the present disclosure.

Similar evolutions of battery SOC, current, temperature and voltage results were similar to those shown in FIGS. 17A and 17B, when using CV-CC charging method (V=6.5V/cell, I=$I_{max}$) described in FIG. 6 for low temperature charging, and when using CC charging method (I=2.8 C) described in FIG. 7 for low temperature charging, and when using CP charging method (P=350 W/cell) described in FIG. 8 for low temperature charging. These charging processes take a total of about 25 minutes, of which about 110 to about 120 seconds are used for low temperature charging which brings the battery temperature from −25° C. to 25° C. The high charge voltage and high internal resistance during the low temperature charging period generate intense internal heating of the battery, bringing about rapid rise of battery temperature and decrease of battery voltage despite that the battery is accepting charge. $V_{LoR}$ and I, important for stability of battery materials, are all within normal operation range during the entire charging process.

Figure 18A:
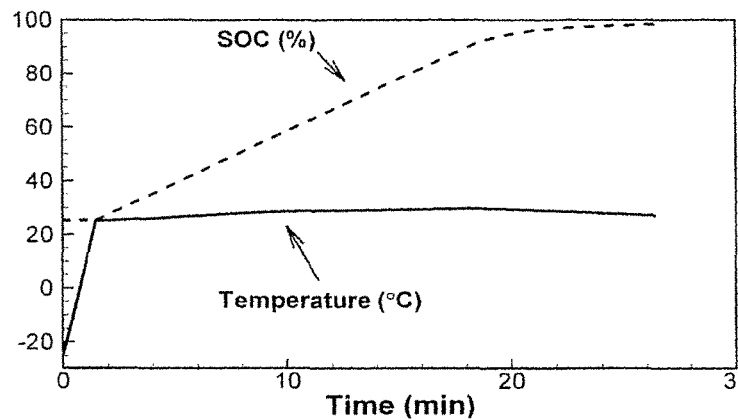
FIGS. 18A, 18B and 18C are graphs showing the results of charging an ohmically modulated battery according to an embodiment of the present disclosure. The charging protocols employed a PV low temperature charging combined with CC-CV normal charging (PV 6.8V–0.4V when T<$T_{CG1}$, CC 2.5 C, CV 4.1V when T≥$T_{CG1}$).
Figure 18B:
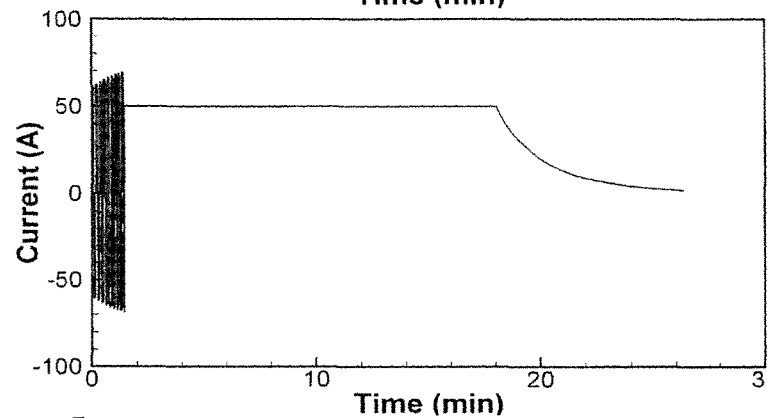
Figure 18C:
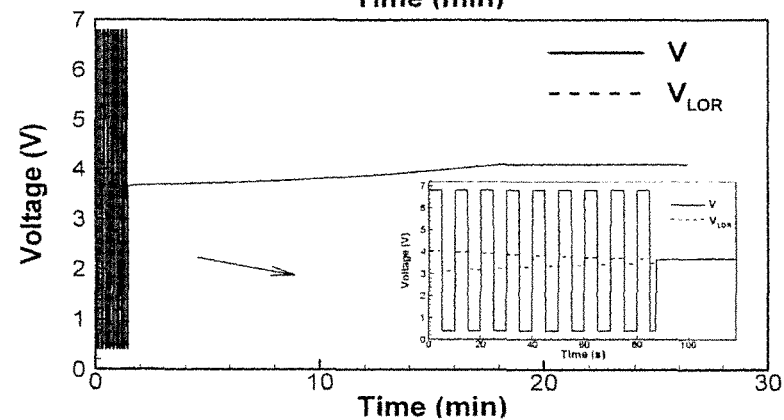

FIGS. 18A and 18B and 18C show the evolutions of battery SOC, current, temperature and voltage obtained using PV charging method ($V_c$=6.8V/cell, $V_d$=0.4V/cell) described in FIG. 9 for low temperature charging, followed by normal charging (CC-CV I=2.5 C, V=4.1V/cell). The entire charging processes takes about 26 minutes, of which only 87 seconds are used for PV charging which brings battery temperature from −25° C. to 25° C. During PV charging period where battery stays at the high resistance mode, battery voltage varies between 6.8V and 0.4V, resulting in intense internal heating of the battery. In the present example, charging current is close to discharging current in magnitude so that little SOC increase is observed during PV charging. However, this set of pulse operation has a benefit of reducing the risk of lithium plating and other side reactions because the concentration polarization in the solid phase of the active materials is suppressed, as known by those skilled in the art. Depending on battery's power capability, the amount of charge capacity can be set larger than the amount of discharge capacity in each/certain period of pulse voltage to further reduce charging time. That is, the PV charging method may be asymmetric in charge vs. discharge pulses. Note also from the inset of FIG. 18C that the low-resistance terminal voltage, $V_{LOR}$, spanning over all battery materials always stays between 3 and 4V, indicating optimal conditions for battery life.

Figure 19A:
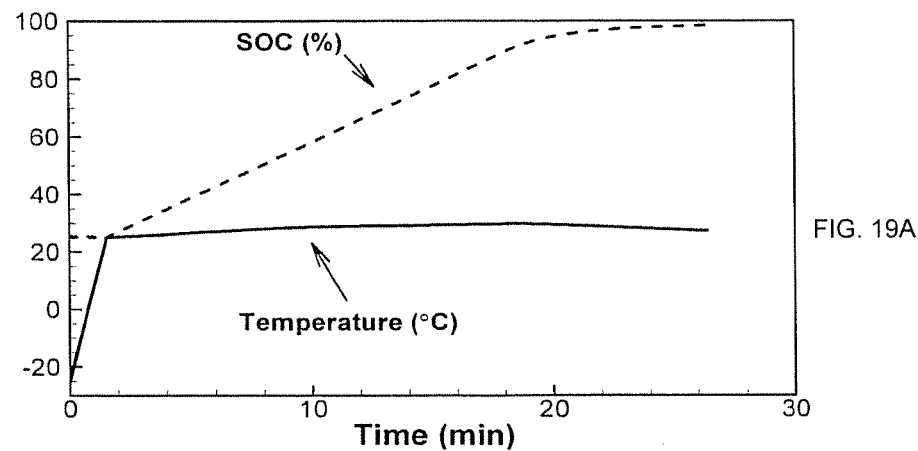
FIGS. 19A, 19B and 19C are graphs showing the results of charging an ohmically modulated battery according to an embodiment of the present disclosure. The charging protocols employed a PC low temperature charging combined with CC-CV normal charging (PC±3.2 C when $T<T_{CG1}$, CC 2.5 C, CV 4.1V when $T≥T_{CG1}$).
Figure 19B:
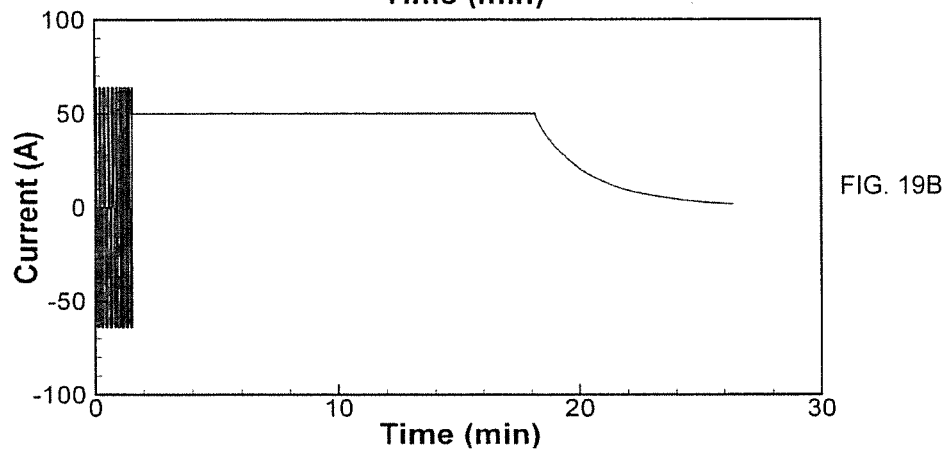
Figure 19C:
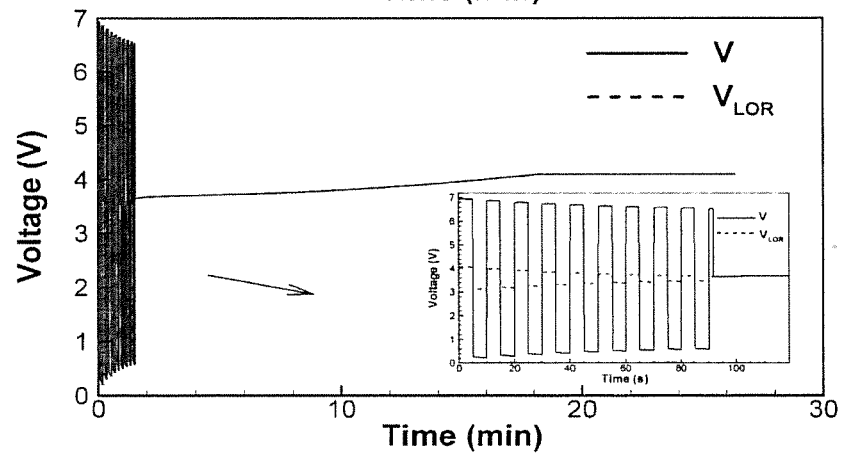
Figure 20A:
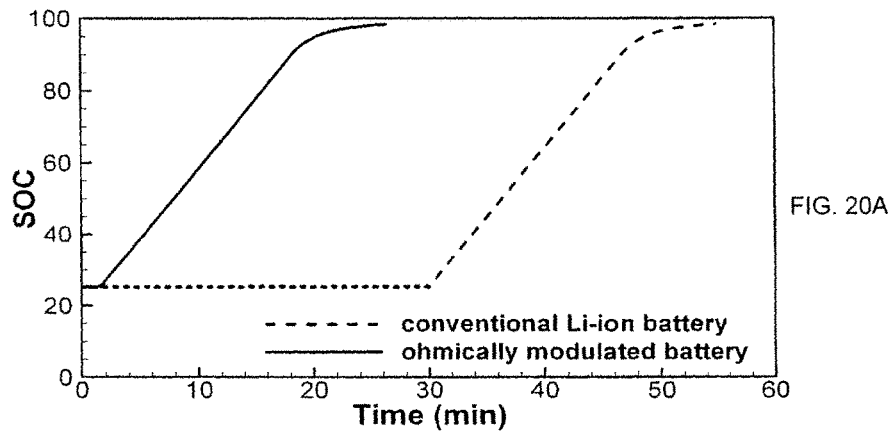
FIGS. 20A, 20B and 20C are graphs showing the results of comparing charging a conventional Li-ion battery with that of an OMB using a PC-CCCV charging protocol.
Figure 20B:
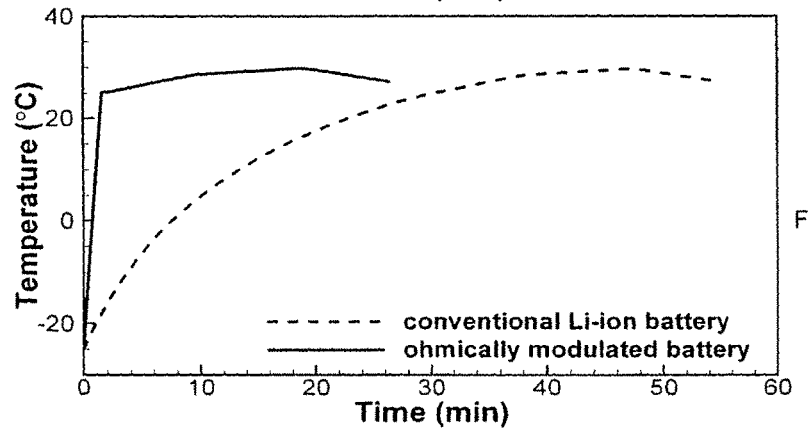
Figure 20C:
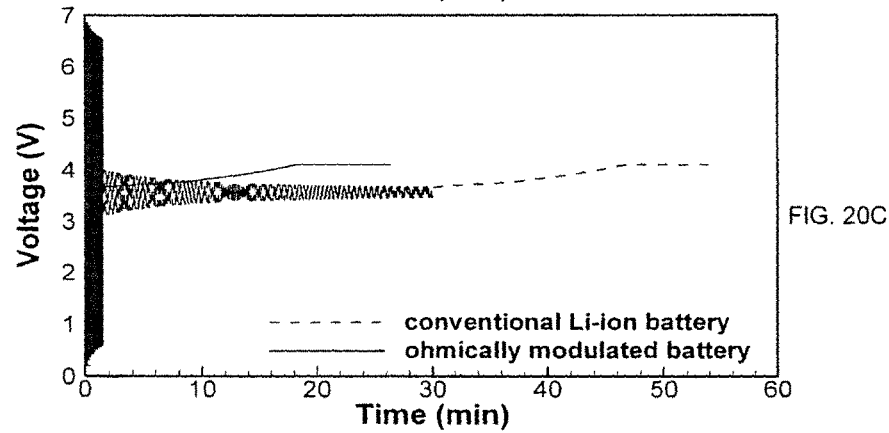

FIGS. 19A-19C show the evolutions of battery SOC, current, temperature and voltage obtained using PC charging method ($I_c$=3.2 C, $I_d$=−3.2 C) described in FIG. 10 for low temperature charging, followed by normal charging (CC-CV I=2.5 C, V=4.1V/cell). Battery demonstrates identical behavior to that using PV charging method shown in FIGS. 18A-18C, except that pulse current is maintained at constant level and thus variations in battery voltage are allowed.

A comparison of the 20 Ah OMB battery (labeled as ohmically modulated battery) and the baseline battery (labeled as conventional Li-ion battery) using PC charging method (described FIG. 10) for low temperature charging are shown in FIG. 23. The low temperature charging period, during which battery temperature rises from −25° C. to 25° C., takes only 92 s for OMB battery. In contrast, this period needs 30 minutes for the baseline battery. The total charging time of the baseline battery (55 minutes) is more than twice that of OMB (26 minutes). It is believe that the difference in performance can be understood by looking at the voltage evolutions of the two batteries during PC charging period. The voltage variation of OMB stays at high level, ranging from 6.8V charge to 0.2V discharge at the beginning and from 6.6V charge to 0.6V discharge at the end of PV charging, while the voltage variation of the baseline battery ranges from 4.1V charge to 3.1V discharge) at the beginning and from 3.67V charge to 3.46V discharge in the later stage during PC charging, implying that the internal heating rate of OMB is much larger and more stable, whereas the internal heating rate of conventional Li-ion battery is small and decreases rapidly with increase of temperature. The benefits of low temperature charging protocols as disclosed herein are fully realized by using OMBs.

Figure 12:
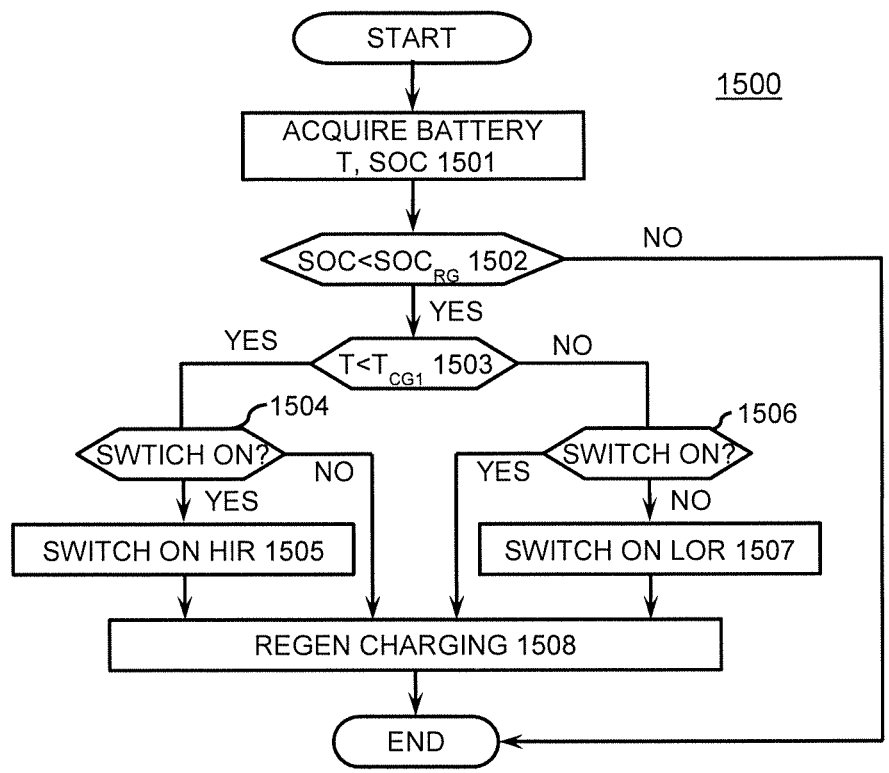
FIG. 12 is a flowchart illustrating a method for regenerative charging of OMB using regenerative charging system, according to an embodiment of the present disclosure.

An example demonstrating regenerative charging using regenerative charging system 1400 described in FIG. 11, regenerative charging methods C-$CV_{LoR}$ described in FIG. 12 and FIG. 15 is given here, using the same batteries, e.g., a 20 Ah OMB and a baseline conventional Li-ion battery. Relevant parameters, such as $T_{CG1}$, $V_{max}$, $V_{min}$, $I_{max}$, are the same as those for low temperature charging. The predetermined SOC for regenerative charging is set to $SOC_{RG}$=60%. Prior to regenerative charging, the test battery is discharged to 30% SOC and then soaked for 5-6 hours in a thermal chamber set at −25° C.

According to the charging methods described in FIG. 12, because the battery's temperature of about −25° C. is less than the predetermined temperature ($T_{CG1}$=25° C.), high-resistance terminal is engaged. During each regenerative charging period, the test battery is charged by a C-$CV_{LoR}$ protocol, wherein I=3 C(60 A) is used for current controlled charging and $V_{LoR}$=4.1V is used for $CV_{LoR}$ charging.

As an example of pulse charging, the regenerative charging process is represented by 10 regenerative charge pulses in the duration of 10 minutes. Each pulse lasts 10 seconds followed by a rest period of 50 s.

Figures 21A, 21B, 21C:
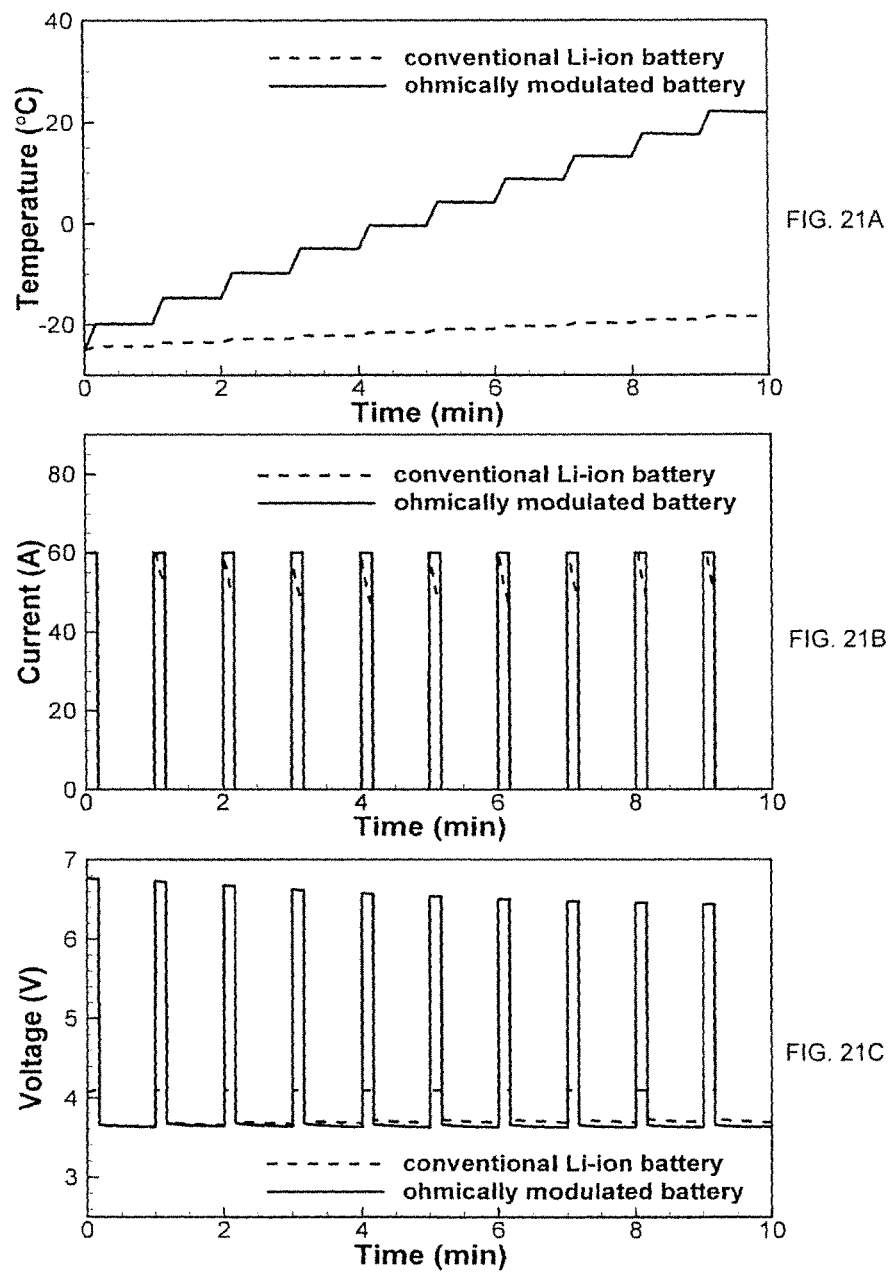
FIGS. 21A, 21B and 21C are graphs showing the results of comparing regenerative charging of a conventional Li-ion battery with that of an OMB using a C-CV$_{LoR}$ charging protocol.

Testing results are shown in FIGS. 21A to 21C. As seen from the temperature evolution, the temperature of the test OMB increases sharply during each regenerative charging period. After ten minutes, its temperature reaches 22.0° C. In contrast, the temperature of the baseline battery shows much smaller increase during each charging period and still stays at very low level (−18.4° C.) at the end of the regenerative charging. The large temperature rise of the test OMB is attributed to its high internal resistance, which generate much higher internal heating rate that incurs on the average of 4.7° C. temperature rise (0.66° C. for the baseline battery) during each 10 s regenerative charging pulse. The benefits of regenerative charging protocols disclosed herein are fully realized by using OMBs.

In addition, as seen from the battery's current and voltage evolution, the tested OMB always stays in constant current mode during charging, whereas the baseline battery switches to $CV_{LoR}$ mode quickly from the second regenerative pulse. The Batteries' different charging modes are caused by their different temperature behaviors. The test OMB stays at much higher temperature, which allows it to accept higher charging current without incurring $CV_{LoR}$ mode. Therefore, the OMB has the additional advantage of high charge acceptance during regenerative braking.

While the aforementioned test results are shown for a Li-ion battery, ohmically modulated batteries based on advanced lithium batteries, nickel-metal hydride (Ni-MH), lead-acid (Pb-acid) and other battery chemistries is expected to have the same advantages.

Only the preferred embodiments of the present invention and examples of its versatility are shown and described in the present disclosure. It is to be understood that the present invention is capable of use in various other combinations and environments and is capable of changes or modifications within the scope of the inventive concept as expressed herein. Thus, for example, those skilled in the art will recognize, or be able to ascertain, using no more than routine experimentation, numerous equivalents to the specific substances, procedures and arrangements described herein. Such equivalents are considered to be within the scope of this invention, and are covered by the following claims.

What is claimed is:

1. A charging control system for charging an ohmically modulated rechargeable battery comprising:
   an ohmically modulated battery comprising at least one negative terminal and at least one positive terminal for operating the battery at a low resistance level and at least one high resistance terminal for operating the battery at a high resistance level through at least one resistor sheet within a cell of the battery or between cells of the battery, wherein the at least one resistor sheet includes two tabs with one tab electrically connected to the at least one high resistance terminal and the other tab electrically connected to either the at least one negative terminal or the at least one positive terminal;
   a temperature sensor configured to monitor a temperature of the battery;
   a switch that can electrically engage the battery to a source of electrical current through either a low-resistance terminal or the high-resistance terminal of the battery; and
   a controller electrically connected to the temperature sensor and the switch and that can receive input from the temperature sensor and is programmed to determine whether to electrically engage the battery to the source of electrical current through either the low-resistance terminal or the high-resistance terminal based on input from the temperature sensor.

2. The charging control system according to claim 1, further comprising:
   a current sensor electrically connected to the battery and capable of measuring current flowing through the battery and/ or a voltage sensor electrically connected to the battery;
   wherein the controller can receive inputs from the temperature sensor and the current sensor and/or voltage sensor and is programmed to determine whether to electrically engage the battery to the source of electrical current through either the low-resistance terminal or the high-resistance terminal based on inputs from the sensors.

3. The charging control system according to claim 1, wherein the switch can electrically engage the high-resistance terminal to the at least one positive terminal of the battery as the low resistance terminal of the battery.

4. The charging control system according to claim 1, further comprising a generator electrically connected to the battery and capable of charging the battery.

5. An electrically powered vehicle comprising the charging control system of claim 4.

6. The charging control system according to claim 1, wherein the ohmically modulated rechargeable battery comprises lithium ion cells.

7. The charging control system according to claim 1, wherein the at least one resistor sheet is within a cell of the battery.

8. The charging control system according to claim 7, wherein the at least one resistor sheet comprises nickel, copper, aluminum, or combinations thereof.

9. A method of charging an ohmically modulated rechargeable battery, the method comprising:
charging the battery under a low temperature charging protocol (LTCP) when the battery is in a high resistance mode; and
charging the battery under a second protocol when the battery is in a low resistance mode
wherein the ohmically modulated battery comprises at least one negative terminal and at least one positive terminal forming the low resistance mode of the battery and at least one high resistance terminal forming the high resistance mode of the battery through at least one resistor sheet within a cell of the battery or between cells of the battery, wherein the at least one resistor sheet includes two tabs with one tab electrically connected to the at least one high resistance terminal and the other tab electrically connected to either the at least one negative terminal or the at least one positive terminal.

10. The method according to claim 9, wherein the LTCP includes: (i) charging the battery at either a constant voltage or a constant charging power (P); and (ii) followed by charging the battery at a constant current; wherein the constant voltage is determined either at the low-resistance terminal voltage $V_{LoR}$ of the battery or at the voltage of the battery.

11. The method according to claim 10, wherein charging the battery at the constant current occurs when the charging current reaches or exceeds a predetermined maximum charge current ($I_{max}$).

12. The method according to claim 9, wherein the LTCP includes charging the battery by alternatively applying charging and discharging pulse power to the battery.

13. The method according to claim 9, further comprising charging the battery in the high resistance mode when a temperature of the battery is below a predetermined level $T_{CG1}$ and charging the battery in the low resistance mode when the temperature of the battery is equal to or above $T_{CG1}$.

14. The method according to claim 13, wherein TCGI is a value between 5° C. and 25° C.

15. The method according to claim 9, wherein the ohmically modulated rechargeable battery comprises lithium ion cells.

16. The method according to claim 9, wherein the at least one resistor sheet is within a cell of the battery.

17. The method according to claim 9, wherein the LTCP includes charging the battery at a constant current (I) in the range of $1C \leq I \leq I_{max}$, wherein $I_{max}$ is a predetermined maximum charge current.

18. A charging control system for charging an ohmically modulated rechargeable battery comprising:
an ohmically modulated battery comprising at least one negative terminal and at least one positive terminal forming a low resistance circuit and at least one high resistance terminal electrically connected to a plurality of resistor sheets within cells of the battery or between cells of the battery or a combination thereof forming a high resistance circuit, wherein each resistor sheet of the plurality of resistor sheets has two tabs, one tab forming the electrical connection to the at least one high resistance terminal and the other tab forming an electrical connection to either the at least one negative terminal or the at least one positive terminal;
a temperature sensor configured to monitor a temperature of the battery;
a switch that can electrically engage the battery to a source of electrical current through either a low-resistance terminal or the high-resistance terminal of the battery; and
a controller electrically connected to the temperature sensor and the switch and that can receive input from the temperature sensor and is programmed to determine whether to electrically engage the battery to the source of electrical current through either the low-resistance terminal or the high-resistance terminal based on input from the temperature sensor.

19. The charging control system according to claim 18, wherein the ohmically modulated rechargeable battery comprises lithium ion cells and the plurality of resistor sheets are within the lithium ion cells.

20. The charging control system according to claim 19, further comprising:
a current sensor electrically connected to the battery and capable of measuring current flowing through the battery and/ or a voltage sensor electrically connected to the battery;
wherein the controller can receive inputs from the temperature sensor and the current sensor and/or voltage sensor and is programmed to determine whether to electrically engage the battery to the source of electrical current through either the low-resistance terminal or the high-resistance terminal based on inputs from the sensors.

* * * * *